United States Patent
Tanpoco

(10) Patent No.: US 11,631,132 B2
(45) Date of Patent: *Apr. 18, 2023

(54) SYSTEM AND METHOD FOR DYNAMICALLY DETERMINING QUANTITY FOR RISK MANAGEMENT

(71) Applicant: TRADING TECHNOLOGIES INTERNATIONAL INC., Chicago, IL (US)

(72) Inventor: Alvin F. Tanpoco, Chicago, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/355,999

(22) Filed: Jun. 23, 2021

(65) Prior Publication Data

US 2021/0390619 A1 Dec. 16, 2021

Related U.S. Application Data

(63) Continuation of application No. 16/425,561, filed on May 29, 2019, now Pat. No. 11,100,582, which is a
(Continued)

(51) Int. Cl.
*G06Q 40/04* (2012.01)
*G06Q 40/00* (2023.01)
(Continued)

(52) U.S. Cl.
CPC ........... *G06Q 40/04* (2013.01); *G06Q 20/382* (2013.01); *G06Q 40/00* (2013.01); *G06Q 40/06* (2013.01)

(58) Field of Classification Search
USPC ..................................... 705/35, 37
See application file for complete search history.

(56) References Cited

U.S. PATENT DOCUMENTS

| 4,674,044 A | 6/1987 | Kalmus et al. |
| 4,914,568 A | 4/1990 | Kodosky et al. |

(Continued)

FOREIGN PATENT DOCUMENTS

| AU | 200240605 | 6/2002 |
| CN | 1392978 A | 1/2003 |

(Continued)

OTHER PUBLICATIONS

International Search Report of International Application No. PCT/US2003/019328, dated Aug. 8, 2003 (mailed Sep. 9, 2003).
(Continued)

*Primary Examiner* — William E Rankins
(74) *Attorney, Agent, or Firm* — McDonnell Boehnen Hulbert & Berghoff LLP

(57) ABSTRACT

A system and method for dynamically determining quantity for risk management are described. According to one example embodiment, as a trader positions an order icon at a desired price or price-derivative value on a graphical interface, an order quantity for the order is dynamically determined based on the order price and a selected risk management formula. A trader can change the price or the price-related value for one or more orders by moving the order icons relative to a price axis on a graphical interface. In such an embodiment, the initially calculated order quantity for each order will be dynamically recalculated based on the modified orders for the trading strategy.

17 Claims, 15 Drawing Sheets

Related U.S. Application Data continuation of application No. 14/828,017, filed on Aug. 17, 2015, now Pat. No. 10,354,326, which is a continuation of application No. 13/558,328, filed on Jul. 25, 2012, now Pat. No. 9,159,103, which is a continuation of application No. 12/789,016, filed on May 27, 2010, now Pat. No. 8,271,903, which is a continuation of application No. 11/409,346, filed on Apr. 21, 2006, now Pat. No. 7,861,185, which is a continuation-in-part of application No. 10/749,000, filed on Dec. 30, 2003, now abandoned.

(60) Provisional application No. 60/504,947, filed on Sep. 22, 2003.

(51) Int. Cl.
*G06Q 20/38* (2012.01)
*G06Q 40/06* (2012.01)

(56) References Cited

U.S. PATENT DOCUMENTS

| | | |
|---|---|---|
| 5,101,353 A | 3/1992 | Lupien et al. |
| 5,136,501 A | 8/1992 | Silverman et al. |
| 5,168,446 A | 12/1992 | Wiseman |
| 5,245,535 A | 9/1993 | Weiss et al. |
| 5,270,922 A | 12/1993 | Higgins |
| 5,297,031 A | 3/1994 | Gutterman et al. |
| 5,689,652 A | 11/1997 | Lupien et al. |
| 5,692,233 A | 11/1997 | Garman |
| 5,787,402 A | 7/1998 | Potter et al. |
| 5,799,287 A | 8/1998 | Dembo |
| 5,809,483 A | 9/1998 | Broka et al. |
| 5,819,238 A | 10/1998 | Fernholz |
| 5,873,071 A | 2/1999 | Ferstenberg et al. |
| 5,918,217 A | 6/1999 | Maggioncalda et al. |
| 5,963,923 A | 10/1999 | Garber |
| 6,014,643 A | 1/2000 | Minton |
| 6,061,662 A | 5/2000 | Makivic |
| 6,064,985 A | 5/2000 | Anderson |
| 6,098,051 A | 8/2000 | Lupien et al. |
| 6,112,189 A | 8/2000 | Rickard et al. |
| 6,134,535 A | 10/2000 | Belzberg |
| 6,161,098 A * | 12/2000 | Wallman ............... G06Q 40/02 705/36 T |
| 6,167,386 A | 12/2000 | Brown |
| 6,195,647 B1 | 2/2001 | Martyn et al. |
| 6,233,566 B1 | 5/2001 | Levine et al. |
| 6,272,474 B1 | 8/2001 | Garcia |
| 6,278,982 B1 | 8/2001 | Korhammer et al. |
| 6,282,521 B1 | 8/2001 | Howorka |
| 6,317,728 B1 | 11/2001 | Kane |
| 6,408,282 B1 | 6/2002 | Buist |
| 6,418,419 B1 | 7/2002 | Nieboer et al. |
| 6,421,694 B1 | 7/2002 | Nawaz et al. |
| 6,553,346 B1 | 4/2003 | Walker et al. |
| 6,630,942 B2 | 10/2003 | Gerra et al. |
| 6,691,094 B1 | 2/2004 | Herschkorn |
| 6,766,304 B2 | 7/2004 | Kemp, II et al. |
| 6,772,132 B1 | 8/2004 | Kemp, II et al. |
| 6,966,050 B2 | 11/2005 | Watase et al. |
| 6,983,260 B2 | 1/2006 | Hummelgren |
| 7,127,424 B2 | 10/2006 | Kemp, II et al. |
| 7,146,336 B2 | 12/2006 | Olsen et al. |
| 7,155,410 B1 | 12/2006 | Woodmansey et al. |
| 7,168,045 B2 | 1/2007 | Fliess et al. |
| 7,181,425 B1 | 2/2007 | Cha |
| 7,228,289 B2 | 6/2007 | Brumfield et al. |
| 7,243,083 B2 | 7/2007 | Burns et al. |
| 7,286,063 B2 | 10/2007 | Gauthey et al. |
| 7,305,361 B2 | 12/2007 | Otero et al. |
| 7,389,268 B1 | 6/2008 | Kemp, II et al. |
| 7,395,506 B2 | 7/2008 | Tan et al. |
| 7,437,325 B2 | 10/2008 | Kemp, II et al. |
| 7,453,443 B2 | 11/2008 | Rytivaara et al. |
| 7,627,904 B2 | 12/2009 | Tokkonen |
| 7,640,207 B1 | 12/2009 | Tanpoco |
| 7,702,568 B1 | 4/2010 | Tanpoco |
| 7,702,569 B1 | 4/2010 | Tanpoco |
| 7,739,164 B1 * | 6/2010 | West ............... G06Q 40/06 705/35 |
| 7,861,185 B1 | 12/2010 | Tanpoco |
| 8,127,274 B2 | 2/2012 | Astheimer |
| 8,145,557 B2 | 3/2012 | Gilbert et al. |
| 8,271,903 B2 | 9/2012 | Tanpoco |
| 8,744,953 B2 | 6/2014 | Tanpoco |
| 9,159,103 B2 | 10/2015 | Tanpoco |
| 10,096,066 B2 | 10/2018 | Lane et al. |
| 10,121,197 B2 | 11/2018 | Lidor et al. |
| 10,296,975 B2 | 5/2019 | Lane et al. |
| 10,354,326 B2 | 7/2019 | Tanpoco |
| 10,438,285 B1 | 10/2019 | Konstantinides et al. |
| 10,504,182 B2 | 12/2019 | Lane et al. |
| 10,572,942 B2 | 2/2020 | Lane et al. |
| 10,748,211 B2 | 8/2020 | Lidor et al. |
| 2002/0038279 A1 | 3/2002 | Samuelson et al. |
| 2002/0046146 A1 | 4/2002 | Otero et al. |
| 2002/0046156 A1 | 4/2002 | Horn et al. |
| 2002/0049661 A1 | 4/2002 | Otero et al. |
| 2002/0055899 A1 | 5/2002 | Williams |
| 2002/0069156 A1 | 6/2002 | Adam et al. |
| 2002/0105550 A1 | 8/2002 | Biebesheimer et al. |
| 2002/0120551 A1 | 8/2002 | Jones |
| 2002/0128950 A1 | 9/2002 | Wu et al. |
| 2002/0138401 A1 | 9/2002 | Allen et al. |
| 2002/0156718 A1 | 10/2002 | Olsen et al. |
| 2002/0198816 A1 | 12/2002 | Gilbert et al. |
| 2003/0004853 A1 | 1/2003 | Ram et al. |
| 2003/0050800 A1 | 3/2003 | Brandt et al. |
| 2003/0069826 A1 | 4/2003 | Guidi et al. |
| 2003/0093348 A1 | 5/2003 | Finn |
| 2003/0093352 A1 | 5/2003 | Muralidhar et al. |
| 2003/0191765 A1 | 10/2003 | Bargh et al. |
| 2003/0236737 A1 | 12/2003 | Kemp, II et al. |
| 2004/0006528 A1 | 1/2004 | Fung |
| 2005/0004852 A1 | 1/2005 | Whitney |
| 2005/0080701 A1 | 4/2005 | Tunney et al. |
| 2005/0165670 A1 | 7/2005 | Woodmansey et al. |
| 2005/0253817 A1 | 11/2005 | Rytivaara et al. |
| 2006/0265453 A1 | 11/2006 | Kaminsky et al. |
| 2007/0174173 A1 | 7/2007 | Brucato |
| 2007/0250769 A1 | 10/2007 | Bass et al. |
| 2007/0250783 A1 | 10/2007 | Wu et al. |
| 2008/0021809 A1 | 1/2008 | Waelbroeck et al. |
| 2008/0040254 A1 | 2/2008 | Waelbroeck et al. |
| 2008/0109785 A1 | 5/2008 | Bailey |
| 2008/0134170 A1 | 6/2008 | Astheimer |
| 2010/0161512 A1 | 6/2010 | Tanpoco |
| 2010/0235301 A1 | 9/2010 | Tanpoco |
| 2012/0290983 A1 | 11/2012 | Tanpoco |
| 2014/0297506 A1 | 10/2014 | Tanpoco |
| 2015/0356681 A1 | 12/2015 | Tanpoco |
| 2017/0186087 A1 | 6/2017 | Lane et al. |
| 2019/0012738 A1 | 1/2019 | Lane et al. |
| 2019/0019252 A1 | 1/2019 | Lidor et al. |
| 2019/0236703 A1 | 8/2019 | Lane et al. |
| 2019/0279303 A1 | 9/2019 | Tanpoco |
| 2020/0051169 A1 | 2/2020 | Lane et al. |
| 2020/0160448 A1 | 5/2020 | Lane et al. |
| 2020/0334756 A1 | 10/2020 | Lidor et al. |

FOREIGN PATENT DOCUMENTS

| | | |
|---|---|---|
| EP | 1067471 A1 | 1/2001 |
| EP | 1104904 A1 | 6/2001 |
| EP | 1217564 A2 | 6/2002 |
| EP | 1217564 A3 | 7/2002 |
| EP | 1246111 A2 | 10/2002 |
| EP | 1246111 A3 | 3/2004 |
| JP | H11-149369 A | 6/1999 |
| WO | 1991/14231 A1 | 9/1991 |
| WO | 1995/26005 A1 | 9/1995 |
| WO | 1998/49639 A1 | 11/1998 |

(56) References Cited

FOREIGN PATENT DOCUMENTS

| WO | 1999/19821 A1 | 4/1999 |
| --- | --- | --- |
| WO | 1999/30259 A1 | 6/1999 |
| WO | 2000/48113 A1 | 8/2000 |
| WO | 2000/52619 A1 | 9/2000 |
| WO | 2000/62187 A2 | 10/2000 |
| WO | 2000/65510 A1 | 11/2000 |
| WO | 2001/09757 A2 | 2/2001 |
| WO | 2001/16830 A1 | 3/2001 |
| WO | 2001/16852 A2 | 3/2001 |
| WO | 2001/22266 A2 | 3/2001 |
| WO | 2001/22315 A2 | 3/2001 |
| WO | 2001/41280 A1 | 6/2001 |
| WO | 2000/62187 A3 | 12/2001 |
| WO | 2001/22315 A3 | 1/2002 |
| WO | 2002/17074 A1 | 2/2002 |
| WO | 2002/33621 A1 | 4/2002 |
| WO | 2002/33623 A1 | 4/2002 |
| WO | 2002/33635 A1 | 4/2002 |
| WO | 2002/33636 A1 | 4/2002 |
| WO | 2002/33637 A1 | 4/2002 |
| WO | 2001/16852 A8 | 6/2002 |
| WO | 2002/47006 A1 | 6/2002 |
| WO | 2002/80433 A2 | 10/2002 |
| WO | 2003/77061 A2 | 9/2003 |
| WO | 2003/77061 A3 | 4/2004 |
| WO | 2007/037310 A1 | 4/2007 |
| WO | 2007/057008 A1 | 5/2007 |

OTHER PUBLICATIONS

Kharouf, J. and Cavaletti, C. "A Trading Room with a View," *Futures*, vol. 27, Nov. 1998, pp. 66-71.

Lehmann, B. and Modest, M., "Trading and Liquidity on the Tokyo Stock Exchange: a Bird's Eye View" [online], *The Journal of Finance*, The American Finance Association, 1994, vol. 49, No. 3, pp. 951-984. [Retrieved on Jan. 3, 2011] from the Internet: http://www.afajof.org/journal/jstabstract.asp?ref=11451.

Pauer, Eric K., et al., "An Architectural Trade Capability Using the Ptolemy Kernel," Proc. of the 1996 IEEE Int. Conference on Acoustics, Speech, and Signal Processing (ICASSP), Copyright IEEE 1996 (4 pages).

Unpublished U.S. Appl. No. 10/749,000, filed Dec. 30, 2003.

USPTO Presentation, NASDAQ, Nov. 8, 2001, 15 pages.

Wang, J., Asymmetric Information and the Bid-Ask Spread: an Empirical Comparison between Automated Order Execution and Open Outcry Auction, *Journal of International Financial Markets, Institutions and Money*, Apr. 1999, vol. 9, Iss. 2, pp. 115-128.

Westland, et al. "Electronic Financial Markets," in *Global Electronic Commerce: Theory and Case Studies*, MIT Press, 1999, pp. 385-444.

William Blair Employee, "Concentrated Stock Positions: Managing Risk and Reward," William Blair and Company, Jun. 2008, pp. 1-16.

X-Media Corp., "Excel 2000 for Windows Super Master", Aug. 2, 2000, 1$^{st}$ Edition, pp. 195-197.

X_Trader Product HTML Page [online], Trading Technologies International, Inc., Jun. 9, 2000. [Retrieved on Mar. 22, 2001] from the Internet: www.tradingtechnologies.com/products/xtrade_full.html.

\* cited by examiner

LIMIT ORDER 502
STOP ORDER 504
STOP LIMIT ORDER 506
TRAILING STOP ORDER 508
STOP AND REVERSE ORDER 510
MARKET ORDER 512
FIGURE 5

SYSTEM AND METHOD FOR DYNAMICALLY DETERMINING QUANTITY FOR RISK MANAGEMENT

CROSS REFERENCE TO RELATED APPLICATIONS

This application is a continuation of U.S. patent application Ser. No. 16/425,561 filed on May 29, 2019, now U.S. Pat. No. 11,100,582, which is a continuation of U.S. patent application Ser. No. 14/828,017, filed on Aug. 17, 2015, now U.S. Pat. No. 10,354,326, which is a continuation of U.S. patent application Ser. No. 13/558,328, filed on Jul. 25, 2012, now U.S. Pat. No. 9,159,103, which is a continuation of U.S. patent application Ser. No. 12/789,016, filed on May 27, 2010, now U.S. Pat. No. 8,271,903, which is a continuation of U.S. patent application Ser. No. 11/409,346, filed on Apr. 21, 2006, now U.S. Pat. No. 7,861,185, which is a continuation-in-part of U.S. patent application Ser. No. 10/749,000, filed on Dec. 30, 2003, which claims the benefit of U.S. Provisional Application No. 60/504,947, filed on Sep. 22, 2003, the entire contents of each of which are incorporated herein by reference for all purposes.

FIELD OF INVENTION

The present invention is directed towards electronic trading. More specifically, the present invention is directed towards a method of managing risk in an electronic trading environment.

BACKGROUND

In recent years, a trend towards electronic trading has become well-established, causing one major exchange after another to replace or at least supplement the traditional open outcry, where a trade is done face to face, with electronic systems which automatically match bids and offers. While the motivation behind using electronic trading may vary from market to market, greater efficiency and volume are some of the considerations.

In particular, subscribing traders are connected to an exchange's electronic trading platform by way of a communication link and through an application program interface to facilitate real-time electronic messaging between themselves and the exchange. The electronic messaging includes market information that is sent from the electronic market to the traders. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all or many price levels, while some provide only quantities associated with the inside market, and others may provide no market depth at all. Additionally, the host exchange can offer other types of market information such as the last traded price ("LTP"), or the last traded quantity ("LTQ").

Just as with an open-outcry exchange, an electronic exchange can list any number of tradeable objects. Traders may choose to trade one tradeable object or more than one tradeable object, and they may simultaneously trade tradeable objects that are listed at more than one exchange. Ordinarily, each tradeable object has its own separate stream of market information. Therefore, in these instances, the traders will generally receive more than one stream of market information such that each stream of market information attempts to characterize a given tradeable object.

As used herein, the term "tradeable object" refers to anything that can be traded with a quantity and price. For example, tradeable objects may include, but are not limited to, all types of traded financial products, such as, for example, stocks, options, bonds, futures, currency, and warrants, as well as funds, derivatives, and collections of the foregoing. Moreover, tradeable objects may include all types of commodities, such as grains, energy, and metals. Also, a tradeable object may be "real," such as products that are listed by an exchange for trading, or "synthetic," such as a combination of real products that is created by the trader. A tradeable object could also be a combination of other tradeable objects, such as a class of tradeable objects.

Once the traders receive market information corresponding to a tradeable object, the market information may be displayed to them via their trading screens. Upon viewing the information, traders take certain actions including the actions of sending buy or sell orders to the electronic market, adjusting existing orders, deleting orders, or otherwise managing orders and risk.

A commercially available trading screen that allows a trader to trade in an electronic environment is X_TRADER® from Trading Technologies International, Inc. of Chicago, Ill. X_TRADER® also provides an electronic trading interface, referred to as MD Trader™. Portions of the X_TRADER® and the MD Trader™-style display are described in U.S. Pat. No. 6,772,132 entitled "Click Based Trading with Intuitive Grid Display of Market Depth," filed on Jun. 9, 2000, U.S. Pat. No. 7,127,424, entitled "Click Based Trading With Intuitive Grid Display of Market Depth and Price Consolidation," filed on Oct. 5, 2001, U.S. Pat. No. 7,389,268, entitled "Trading Tools For Electronic Trading," filed on Apr. 19, 2002, and U.S. Pat. No. 7,228,289, entitled "A System and Method for Trading and Displaying Market Information in an Electronic Trading Environment," filed on Feb. 28, 2003, the contents of each are incorporated herein by reference.

Using a trading screen a trader can set order parameters before sending the order to an electronic exchange. Specifically, a trader could open an order ticket before placing an order. Within an order ticket the trader can manually set, among other parameters, the desired price and the desired quantity. The trader must then select a send button to submit the order to the electronic exchange with the defined parameters associated with it. Another common method of manually setting order parameters is to use a single action method of entering order parameters, where the trader defines a default quantity and using a mouse the trader selects the price level at which to place an order. When the order is submitted it has the trader-defined default quantity associated with it.

There are a number of risk management formulas available to assist traders in managing risk. Conventionally, the traders utilize the risk management formulas and then manually calculate a result that can help a trader determine how they should trade to maximize profits and minimize risk.

These variables may be based on, among other things, risk parameters or market conditions.

Some traders feel that the quantity associated with an order is somewhat arbitrary in that it does not matter what the quantity is, but simply that the market moves in the direction trader's of the submitted order. However, the decision regarding how much quantity to associate with a given order can be as important as the decision of what price level at which to place the order. While a trading system may assist the trader in what to trade, when to trade, and at what price to trade, it is just as important for a trading system to aid the trader in determining how much quantity to trade in order to maximize profits and minimize risk.

There continues to be a need for a risk management tool that will allow traders to more accurately manage risk when placing orders through an order entry trading screen in an electronic trading environment.

BRIEF DESCRIPTION OF THE FIGURES

Example embodiments of the present invention are described herein with reference to the following drawings, in which:

FIG. 5 is a block diagram illustrating a plurality of graphical icons that can be used to represent a plurality of order types;

DETAILED DESCRIPTION

I. Overview

Figure 1:
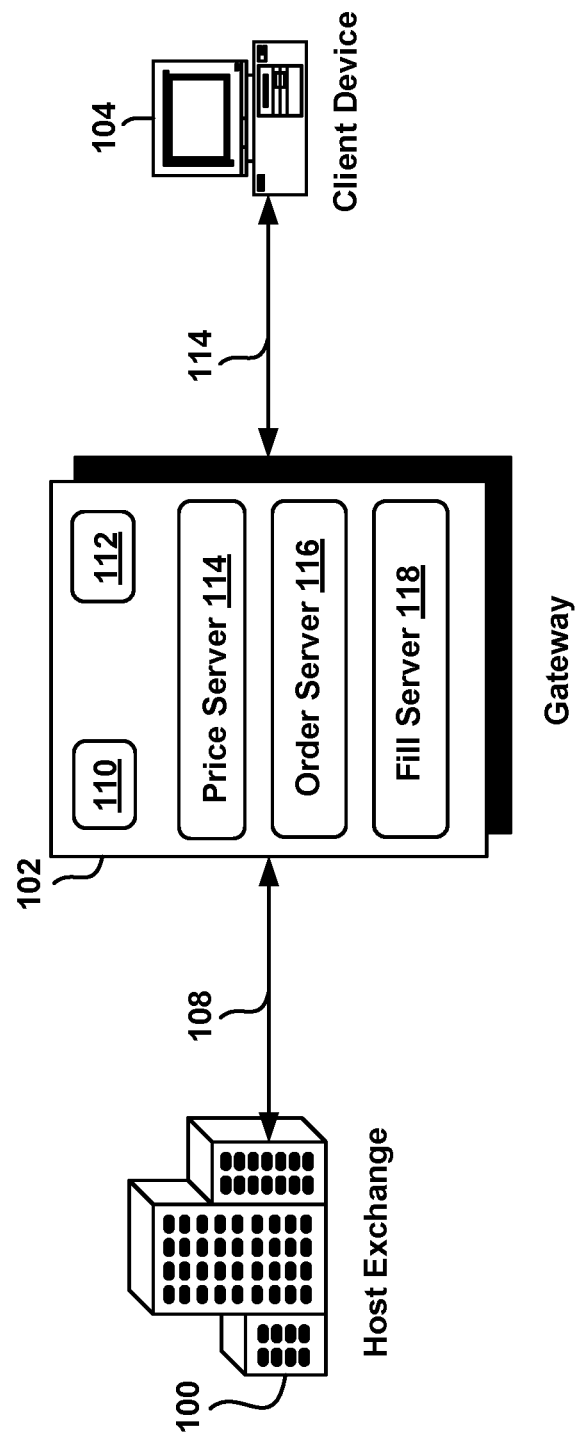
FIG. 1 is an example network configuration for a communication system utilized to access one or more exchanges.

A system and method for managing risk by dynamically determining an order quantity to be used for an order to be placed at an electronic exchange are provided.

A difficult decision for a trader to make, is how much money to risk on each order. Risk management can be achieved through proper sizing of each order in terms of the risk-reward preference of the trader, group of traders, or trading firm. Determining the quantity to be used with an order is critical to risk management. Risking too little quantity on an order and traders may not gain the maximum amount of profits; risking too much quantity on an order and the losses could cost a trader his total equity. Somewhere in between risking too little quantity and too much quantity is where a trader can gain the maximum potential for long-term profits.

As will be described in greater detail below, a trader can establish a trading strategy by placing a number of order icons in relation to a value axis, such as a price axis, on a graphical interface. The order icons corresponding to a single strategy can be graphically connected to enable a trader to quickly determine the relationship between the orders that correspond to the same trading strategy. The relationship between the orders of a trading strategy may indicate order execution precedence, such as order dependency, or yet some other relationship. A trader can easily move the order icons on the graphical interface to effectively change a price for one or more orders that create the trading strategy.

According to the example embodiments, an order quantity associated with each order can be dynamically determined based on order price and applicable risk management formula, rather than using an order ticket or single action method to manually associate a quantity with an order, as done with conventional trading screens. According to one example embodiment, as a trader positions an order icon at a desired price or price-derivative value on a graphical interface, an order quantity for the order is dynamically calculated based on the order price and an applicable risk management formula corresponding to the trading strategy. The risk management formula takes into consideration the price selected by a trader for each individual order corresponding to the trading strategy.

Dynamically calculating the quantity reduces the risk experienced by a trader by increasing their efficiency in placing orders. A trader will be more likely to get orders filled at their desired prices and for their desired quantities while optimizing their profits. The trader is more accurate as they no longer have to calculate the risk management formula on their own to determine how much quantity they can afford to risk on each order. The trader is also more efficient as there is no longer a need to manually set a quantity through an order ticket or through single action order entry.

As will be described in greater detail below, a trader can change the price or the price-related value for one or more orders corresponding to a trading strategy by moving the order icons relative to a value axis on a graphical interface. In such an embodiment, the initially calculated order quantity for each order will be dynamically recalculated based on the modified orders for the trading strategy.

While the example embodiments described herein with reference to illustrative embodiments for particular applications, it should be understood that the embodiments are not limited thereto. Those having ordinary skill of art will recognize that many additional modifications and embodiments are possible as well.

II. Hardware and Software Overview

FIG. 1 is a block diagram illustrating an example trading system in accordance with the example embodiments. The system includes a host exchange 100, a gateway 102, and a client device 104. FIG. 1 illustrates a single client device that is connected to a single exchange via a gateway; however, it should be understood that a plurality of client devices could connect to a plurality of exchanges via a plurality of gateways.

Although each referenced component in FIG. 1 is described directly below in their respective sections, it should be understood that the components may take the form of an entirely hardware embodiment, an entirely software embodiment, or an embodiment combining software and hardware aspects. Furthermore, some of the components of FIG. 1 may take the form of a computer readable medium having a computer readable program code means embodied in a storage medium. Any suitable computer readable medium may be utilized including hard disks, CD-ROMs, optical storage devices, or magnetic storage devices. Also, it should be understood that the example embodiment may be implemented on many other system configurations.

A. Exchange

According to one example embodiment, host exchange 100 may include basic or more complex systems that automatically match incoming orders. Some example exchanges include the London International Financial Futures and Options Exchange ("LIFFE"), the Chicago Board of Trade ("CBOT"), the Chicago Mercantile Exchange ("CME"), the Exchange Electronic Trading ("Xetra," a German stock exchange), the European exchange ("Eurex"), or Euronext. Exchange 100 might also refer to other known or later developed facilities that automatically match incoming orders that are received from client devices. The example exchanges and other exchanges are well known in the art.

Exchange 100 allows traders to trade tradeable objects that exchange 100 offers for trading. As used herein, the "tradeable object" refers simply to anything that can be traded with a quantity and/or price. It includes, but is not limited to, all types of tradeable objects such as financial products, which can include, for example, stocks, options, bonds, futures, currency, and warrants, as well as funds, derivatives, and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of tradeable objects, such as a class of tradeable objects.

According to the example embodiments, to keep participating traders informed of changes in a market, exchange 100 relays market information over a transmission channel 108 to client device 104 via gateway 102. Transmission channel 108 can include any connection types being used by exchange 100, such as a T1 line, for example, and the transmission channel can carry information in either analog or digital format. It should be understood that exchange 100 could use a number of different communication protocols for connecting and sending market information to client devices. For example, exchange 100 can connect to client device 104 via gateway 102 using TCP/IP, and can provide market information using the Financial Information Exchange ("FIX") protocol, which is a messaging standard developed specifically for real-time electronic exchange type transactions. FIX is a public-domain specification owned and maintained by FIX Protocol, Ltd.

Market information that exchange 100 sends to client device 104 via gateway 102 may include data that represents just the inside market, where the inside market is the lowest sell price (best offer) in the market, and the highest buy price (best bid) in the market at a particular point in time. Market information may also include market depth, where market depth refers to quantities available at the inside market and can also refer to quantities available at other prices away from the inside market. It should be understood that market information can also contain other types of market information such as the last traded price ("LTP"), or the last traded quantity ("LTQ"). Additionally, the market information that is sent to a single trader may include order and/or fill information related to orders associated with that trader.

Once a trader submits an order to an exchange, the exchange may process the order using different execution algorithms, and the type of the algorithm used may depend on the tradeable object being traded. Some example order execution algorithms include first-in-first-out ("FIFO") and pro-rata algorithms. The FIFO algorithm, used for some tradeable objects listed with Eurex, for example, gives priority to the first person in an order queue at an exchange to place an order. The pro rata algorithm, used for some tradeable objects listed with LIFFE, for example, splits orders for the same price, and the orders at identical prices are filled in proportion to their size. Also, it should be understood that the price order queue is a term that covers a broad range of systems used by an exchange to conduct orderly financial transactions such as, for example, a FIFO based system or a pro rata system. Also, the present invention is not limited to any particular type of order execution algorithm, and different algorithms could also be used.

B. Gateway

According to the example embodiment, gateway 102 can be a computer running software that receives market information and order information from host exchange 100. As used herein, a computer includes any device with memory 110 and a processor 112 capable of processing information to produce a desired result. Thus, gateway 102 can be a computer of any size such as a server, workstation, personal computer, or laptop, but, generally, gateway 102 can be any computer device that has the processing capability to perform the function described herein. Also, it should be understood that the functions of gateway 102 could be moved to host exchange 100 and/or client device 104 to reduce or eliminate the need for gateway 102.

In the example embodiment, gateway 102 receives market information as well as order related data from host exchange 100, and forwards the received data to client device 104. In one embodiment, while market information may be transmitted between exchange 100 and client device 104 using multicast transmission, order related information, such as order fills, order requests, or order modification requests are typically sent using unicast transmission. As known in the art, while the multicast allows for communication between a single sender and multiple receivers in the network, the unicast only allows for communication between a single sender and a single receiver. It should be understood that while there are many possible protocols that can be used to multicast and unicast information between exchange 100 and client device 104 via gateway 102, the Pragmatic General Multicast ("PGM") protocol could be used for multicasting, and the Point to Point Protocol ("PPP") could be used for unicasting, for example.

Also, as known by those skilled in the art, gateway 102 may have one or more servers to support data feeds that are received from exchange 100. In one embodiment, gateway 102 may include a price server 114 for processing price information, an order server 116 for processing order information, and a fill server 118 for processing fill information. Generally, a server is software that responds to commands from client device 104 in form of subscription. That is, a trader at client device 114 can subscribe to price information, order information, and fill information for a particular tradeable object being offered at host exchange 100. In one embodiment, the subscription may be established via a process of sending a number of messages between client device 104 and gateway 102. For example, gateway 102 may first authenticate a trader at client device 104, and then client device 104 may establish separate communication links, such as IP links, to each server at gateway 102. In the embodiment illustrated in FIG. 1, client device 104 would establish three separate IP connections to three servers at gateway 102.

Price server 114, order server 116, and fill server 118 receive information from exchange 100. According to a example embodiment, price server 114 may receive and process price information related to one or more tradeable objects being offered at exchange 100, while order server 116 may receive and process order related information. In one embodiment, exchange 100 may be connected to gateway 102 using two communication links, a first link between exchange 100 and price server 114, and a second link between exchange 100 and order server 116. In such an embodiment, a separate connection may exist between order server 116 and fill server 118 such that, when the order information that is received at order server 116 includes any fill related information, order server 116 may pass the fill data to fill server 118, which may then process and send the fill data to client device 104. It should be understood that the gateway configuration described above is only one example, and different implementations are possible as well.

C. Client Device

Client device 104 can be a computer, such as a workstation, desktop, laptop, handheld device, and so forth, that allow a trader to trade one or more tradeable objects that are offered at exchange 100. Client device 104 may include at least processor and memory. The processor and memory, which are both well-known computer components, are not shown in the Figure for sake of clarity. Preferably, the processor has enough processing power to handle and process various types of market information. The more market information is received and processed, the more processing power is example. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, or any other physical medium with patterns of holes, a RAM, a PROM, an EPROM, a FLASH-EPROM, and any other memory chip or cartridge, or any other medium from which a computer can read.

Client device 104 can communicate with gateway 102 via different networks, such as Local Area Network ("LAN"), a Wide Area Network ("WAN"), or a wireless network via a Virtual Private Network ("VPN"), for example, or a combination thereof. Also, gateway 102 and client device 104 can communicate order and market related information using any messaging protocols, such as any proprietary messaging protocols. However, it should be understood that different networks and different messaging protocols could also be used.

When client device 104 receives market information and order related information from exchange 100, the received information may be displayed to the trader(s) on the visual output device or display device of client device 104. However, it should be understood that the information could be provided to a trader using other means such as sound. The output device can be any display device. For example, the display could be a CRT-based video display, an LCD-based or a gas plasma-based flat-panel display, a display that shows three-dimensional images, or some other type of display.

Upon viewing the market information or a portion thereof, a trader may wish to send orders to an exchange, cancel orders, change orders, query an exchange, and so on. To do so, the trader may input various commands or signals into client device 104 such as by typing into a keyboard, inputting commands through a mouse, or inputting commands or signals through some other input device. For instance, a trader may click a mouse button to initiate an order to buy a particular quantity of the tradeable object at a particular price. Then, client device 104 preferably generates transaction information. There are many different types of messages and/or order types that can be submitted, all of which may be considered various types of transaction information. Once generated, transaction information is sent from client device 104 to host exchange 100 over communication links.

In the example embodiment, client device 104 uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, client device 104 could run automated types of trading applications.

Figure 2:
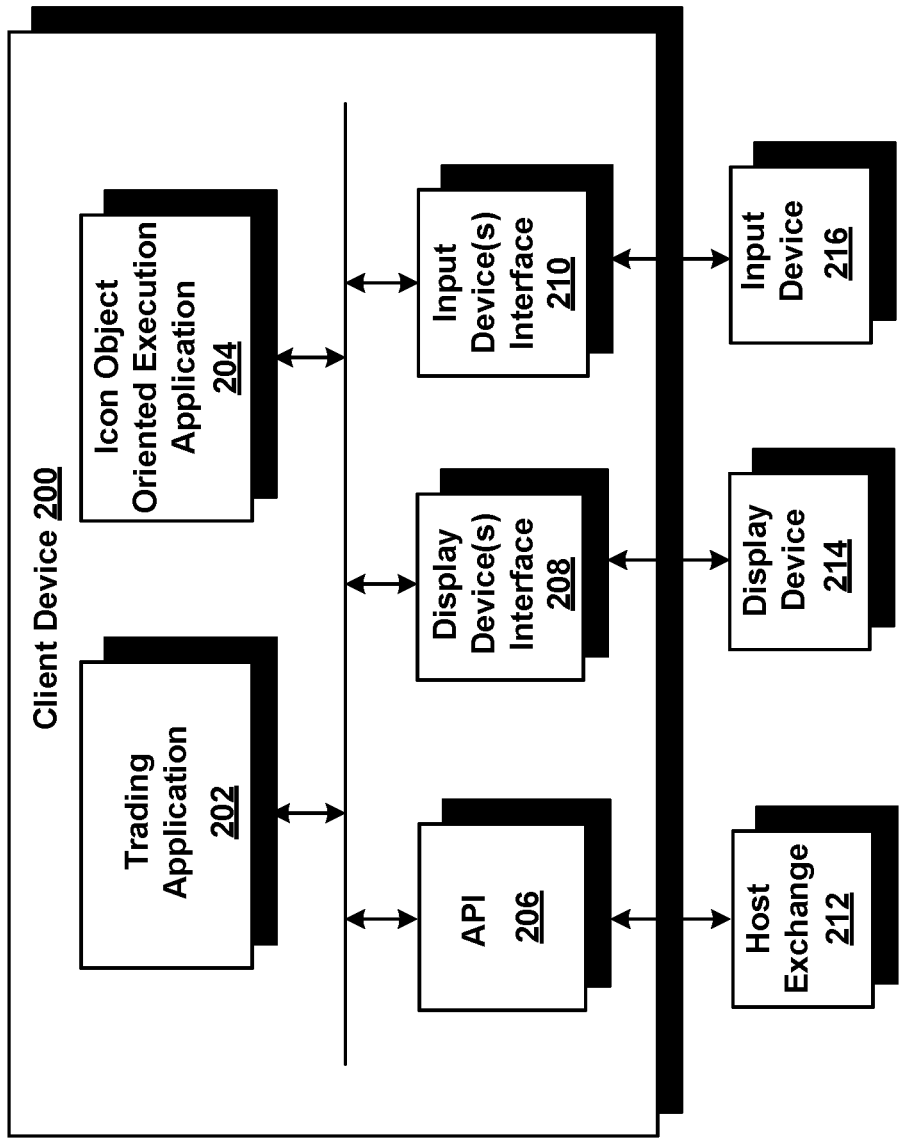
FIG. 2 is a block diagram illustrating an example client device that can be used to carry out the example embodiments.

FIG. 2 is a block diagram illustrating an example client device 200, which may be similar to the type of client device 104 shown in FIG. 1. The client device 200 can be any particular type of computing device, examples of which were enumerated above. According to the example embodiments, the client device 200 has a trading application 202 and an icon oriented execution application 204, both of which could be stored in a memory unit. For example, the trading application 202, when executed, may arrange and display market information in many different ways, depending on how the trader prefers to view the information.

The icon oriented execution application 204 can implement the embodiments for trading using a plurality of graphical icons representing order types being offered in relation to one or more tradeable objects selected by a trader for trading, the embodiments of which will be described in greater detail below. Preferably, the trading application 202 and the icon oriented execution application 204 have access to market information through an application programming interface ("API") 206, and the applications can also forward transaction information to the host exchange 212 via the API 206. Also, the trading application 202 and/or the icon oriented execution application 204 could receive other types of data, such as news related data, through the API 206 from outside sources.

Additionally, the trading application 202 and the icon oriented execution application 204 could receive signals from an input device 216 via an input device interface 210, and can be given the ability to send signals to a display device 214 via a display device interface 208, the embodiments of which will be described in greater detail below.

III. Icon Oriented Representation of Trading Strategies

Figure 3:
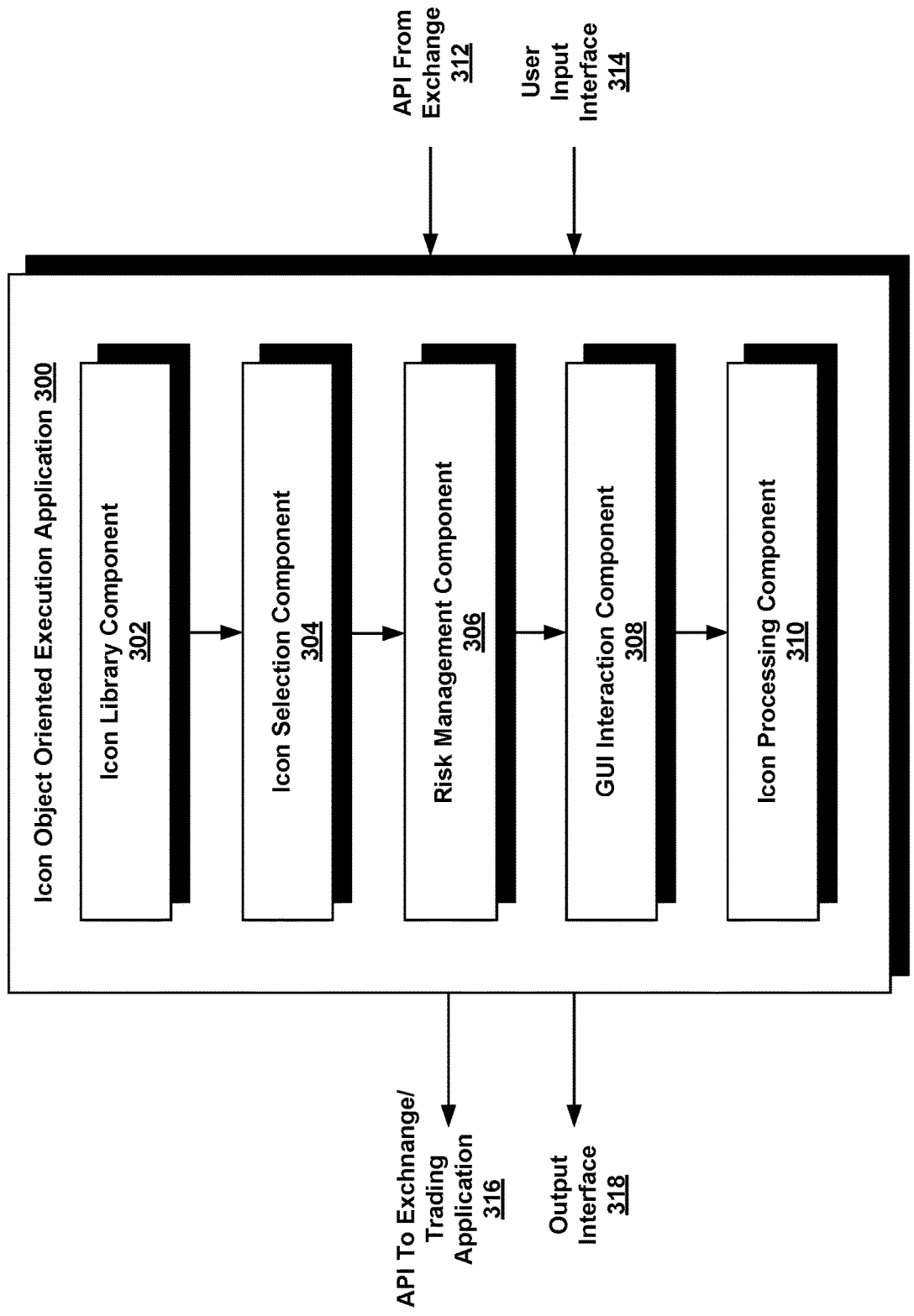
FIG. 3 is a block diagram illustrating an example icon oriented execution application that can be used to carry out the example embodiments.

FIG. 3 is a block diagram illustrating an icon object oriented execution application 300 that may be used for carrying out the example embodiments. The icon oriented execution application 300 includes an icon library component 302, an icon selection component 304, a risk management component 306, a graphical user interface ("GUI") interaction component 308, and an icon processing component 310. The components 302, 304, 306, 308, and 310 may include software and/or hardware elements to perform their functions. However, it should be understood that the icon oriented execution application 300 may include more or fewer components than those illustrated in FIG. 3. Also, the illustrated components could be combined with other components. For example, the icon oriented execution application 300 could be combined with the trading application components of a particular client device.

The icon library component 302 may store different types of executions icons representing order types available at different exchanges. In one embodiment, the icons may be grouped based on an exchange, such that when a trader connects to an electronic exchange, the icon oriented execution application 300 may automatically retrieve and provide to the trader a specific set of icons corresponding to the order types available at the selected exchange. It should be understood that the embodiments described hereinafter are not limited to any specific exchange order types, and order types could include any equity, derivative, foreign exchange, or bond order types, for example.

According to example embodiments, the order execution icons may take many different graphical formats and can be user configurable. For example, the icon library component 302 can include a plurality of preset graphical icon representations corresponding to different order types being offered at one or more exchange, the example embodiments of which will be described in greater detail in reference to subsequent figures. However, the format of execution icons could also be modified based on the user preferences. The modified execution icons could also be saved in the icon library component 302.

Once a trader connects to an electronic exchange, the icon selection component 304 may select and display to a trader via the output interface 318 a set of icons corresponding to the order types being offered at the selected exchange. In addition to defining icons based on order types, different icons could also be used for different tradeable objects that a trader selects for trading. In one embodiment, a trader could select a symbol, a character, or an indicator to represent a tradeable object, and the selected representation for the tradeable object could be displayed in relation to order execution icons corresponding to different order types associated with the tradeable object. Also, it should be understood that the icons could take different formats to represent a buy order and a sell order, and the icon size could be used to represent and control an order quantity. Thus, each icon, when used by a trader, may be already auto-populated with a set of parameters defined by a trader including, but not limited to, an exchange identifier, a tradeable object identifier, a quantity, an order type identifier, and an identifier representing a buy or a sell.

The Risk Management component 306 allows a trader to define risk parameters to be used for determining a quantity for each order associated with an order icon. According to one example embodiment, through the risk management component 306, a trader can select a risk management formula to utilize during the trading session. Based on the risk management formula that is selected, the corresponding risk parameters will be provided for the trader to define. Once the risk parameters are defined, the trader can use the GUI interaction component 308 to assist them in placing an order with the electronic exchange.

The GUI interaction component 308 may allow a trader to initiate the process of placing an order to an exchange using one of the icons. According to one example embodiment, when a trader selects a tradeable object to trade, the icon oriented execution application 204 may display to a trader an icon oriented execution interface that the trader may use in combination with the icons to preconfigure orders and/or trading strategies that can be submitted to one or more exchanges once one or more conditions defined by a trader are satisfied. It should be understood that conditions defining when an order should be submitted to an exchange can take many different formats. For example, an order associated with an icon can be sent to an exchange when the icon oriented execution application 300 detects placement of an icon on the graphical interface, or when a fill associated with another order is detected, or upon detecting a predetermined time defining when an order associated with an icon should be submitted to an exchange. Similarly, when the icon oriented execution application 300 detects the placement of an icon, it may check to see if risk parameters have been defined through use of the risk management component 306. If risk parameters are detected, the icon oriented execution application 300 will dynamically calculate the quantity to be used with the order(s) based on the price of the order(s), before submitting them to the exchange. However, it should be understood that different conditions defining when the trading application 202 should be ready to send an order or a plurality of orders associated with a trading strategy to one or more exchanges could be defined as well.

The icon oriented execution interface may take many different formats, some of which will be illustrated in the subsequent figures. For example, the interface may include a value axis, and a trader may use the value axis as a reference for placing order icons on the icon oriented execution interface. In one example embodiment, the value axis may display prices associated with a tradeable object selected by a trader for trading, any derivative of prices, or volatility of some user-selected values. However, it should be understood that the value axis is not limited to displaying prices, and it could also display different values as well, and more than one value axis could also be displayed in relation to the same interface to represent values associated with more than one tradeable object.

In another embodiment, the icon oriented execution interface could display one or more charts related to one or more tradeable object selected by a trader for trading. For example, the chart may display historical and real time quotes associated with the selected tradeable object. In such an embodiment, the chart may be displayed in relation to a time axis, and the time intervals displayed in relation to the time axis could be user configurable. Also, the time displayed in relation to the time axis may represent past and/or future time.

According to one example embodiment, when the application 204 activates the icon oriented execution interface and displays execution icons, a trader may select a drop down menu to define risk parameters, select one of the icons, and position the selected icon in relation to a value axis, such as in relation to a specific price level on a price axis, for example. To do that, a trader may drag an icon to a position on the interface corresponding to the desired price level at which the trader wishes to place an order. It should be understood that more than one point on the interface may correspond to a specific price level. For example, if a value axis corresponding to a price axis is displayed vertically, a trader may position an icon at a specific price by placing it at any point corresponding to a y-coordinate of the desired price displayed in relation to the price axis. Alternatively, if the graphical interface displays a chart, a trader could place an icon in relation to any point on the chart, and the application 204 could resolve a price level for an order corresponding to the icon based on the selected point on the chart. It should be understood that the trader could use any pointing means to drag an icon to a desired price level on the interface, and some of the means may include a mouse, a joystick, a stylus, or a human finger when an appropriate display interface is used.

In one embodiment, once the GUI interaction component 308 detects placement of an icon in relation to a specific price level on the provided graphical interface, for example, the trading application 202 can be ready to dynamically calculate the quantity associated with the order based on the order placement and to send an order corresponding to the icon when one or more conditions associated with the icon are satisfied. It should be understood that the conditions could be based on any trader-related events, exchange-related events, or may be related to detecting predefined states corresponding to other orders. An order corresponding to an icon may be submitted to an exchange upon detecting a predetermined user input associated with a request to send the order to the exchange, or upon detecting that a trader's profit or loss reaches a predetermined level. For example, once an order icon is placed on the graphical interface, the trading application 202 can dynamically calculate the quantity to be used with the order corresponding to the order icon, using the predefined risk parameters. However, based on the risk management formula chosen by the trader, different risk parameters could be used. Once the quantity is calculated the trading application 202 will send the order to the exchange.

The exchange-related events may be of many different types, such as detecting a predetermined price level related to one or more tradeable object, detecting a predetermined volume being traded, or may include any different events. Also, submission of an order corresponding to an icon may depend on detecting a fill corresponding to another order. However, it should be understood that the conditions triggering submission of an order to an exchange are not limited to the examples given above, and the conditions could take different formats as well. Also, in an alternative embodiment, an order corresponding to an icon can be automatically submitted to an exchange when the GUI interaction component 306 detects placement of the icon on a graphical interface. It should be understood that since any selected icon is auto-populated with order parameters, including, among other parameters, an order type, a tradeable object identifier, price, and risk parameters that is resolved based on a position of the icon on the interface, the order may be sent to an exchange without any user intervention once one or more preset conditions are satisfied.

When an order is submitted to an exchange, the icon processing component 310 may change a format of an icon corresponding to the order to represent different states of the order. It should be understood that a trade could be alerted about many different order state changes, including order states occurring before an order is sent to an exchange, or any order state changes once an order is sent to an exchange. In one embodiment, the icon processing component 310 may change colors of the icon to represent different states of the order. For example, green could be used to represent an order that has been sent and successfully received at an exchange, red could represent an order that has been cancelled and confirmed by the exchange, blue could represent an order that has been sent to but not confirmed by an exchange, orange could represent an order that is contingent upon another order having been executed, purple could represent an order that has been cancelled but not confirmed by an exchange, and gray could represent an order that has a static state. It should be understood that the colors and order states are only examples, and a trader could configure trader-preferred colors and different order states as to which the trader wishes to be alerted.

Figure 4A:
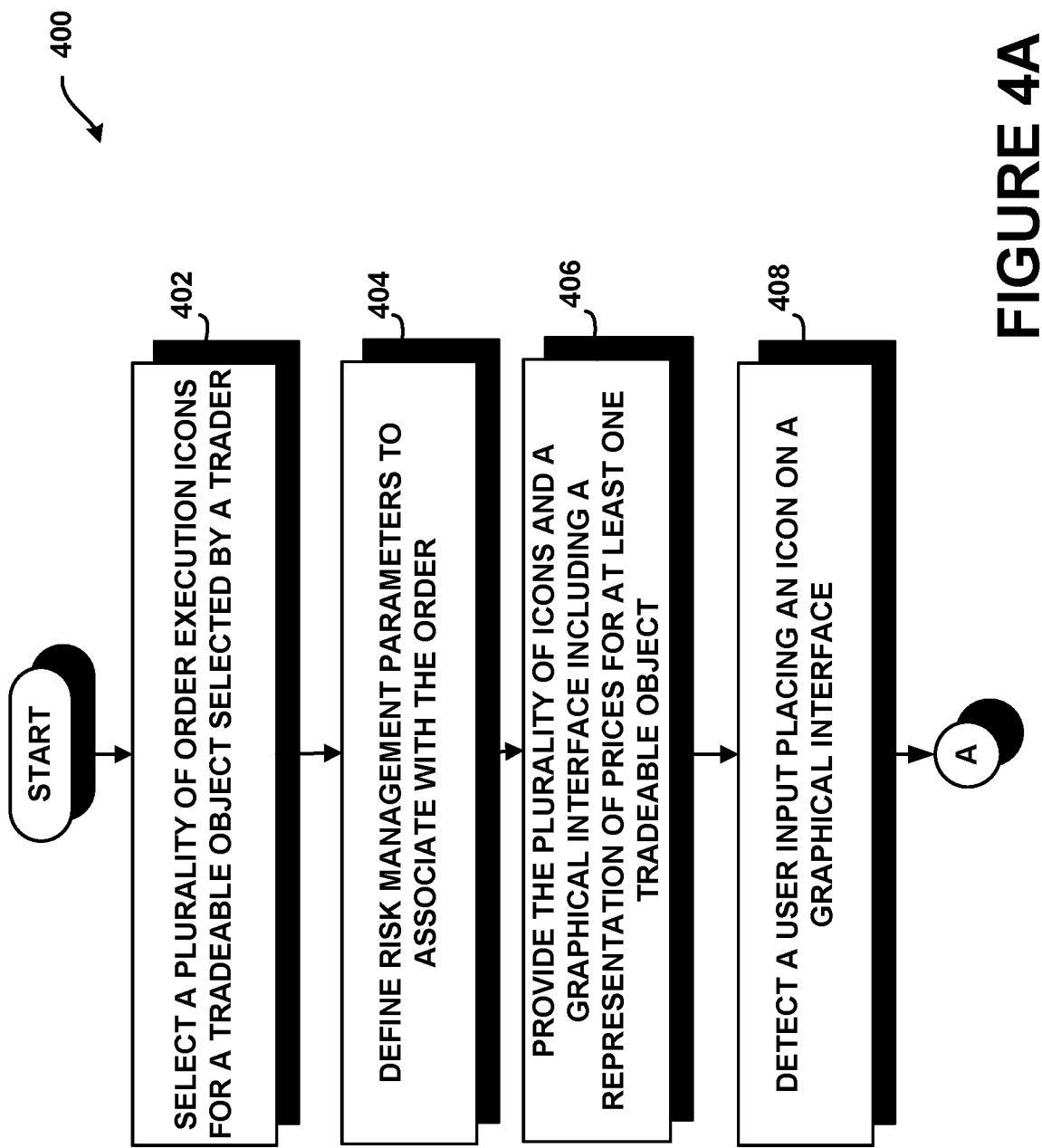
FIGS. 4A-4B are a flow chart illustrating an example method for trading using execution icons and risk management.
Figure 4B:
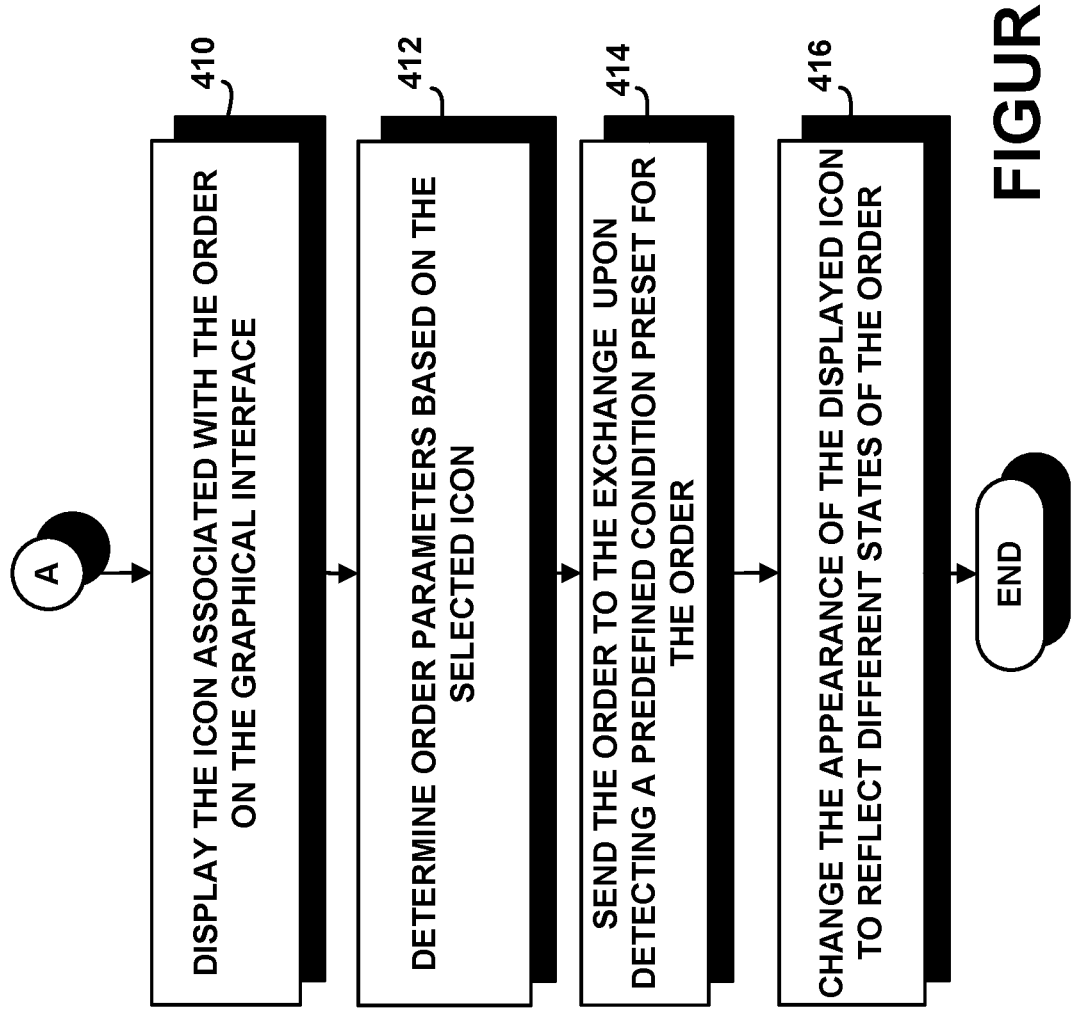

FIGS. 4A and 4B are a flow chart illustrating one example method 400 for trading using execution icons with predefined risk parameters. The method 400 will be described in relation to the components illustrated in FIG. 3; however, it should be understood that different components could also be used to execute the method. Also, it should be understood that the flow chart only shows the functionality and operation of a possible implementation of the present embodiments. In this regard, each block may represent a module, a segment, or a portion of the code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 402, the icon selection component 304 may select a plurality of execution icons from an icon library to represent order types available for a tradeable object selected by a trader. According to an example embodiment, the icon selection component 304 may initiate the process of selecting the icons once a trader logs in to an exchange and selects tradeable objects that the trader wishes to trade.

At step 404, the risk management component 306 provides, via the output interface 318, the means to select a risk management formula to utilize during the trading session. In one example embodiment, the trader can predefine risk parameters corresponding to the selected risk management formula, to be used in calculating the quantities associated with each order or a trading strategy corresponding to a plurality of orders. For example, risk management formulas that could be used are the Kelly Formula, Constant Dollar, or Percent of Total Equity.

The Kelly Formula determines the optimal percent of equity to place on each trade based on historical trading accuracy and allows traders to ensure optimized allocation of the equity.

Another risk management formula is known as Constant Dollar. Constant Dollar defines a dollar amount to be risked for every trading strategy submitted to the exchange. Using an automatically defined dollar amount for every order may allow a trader to enter orders more efficiently, while not concerning themselves with order size.

Another risk management formula is Percent of Total Equity. Percent of Total Equity allows a trader to dynamically scale their order quantity based on a beginning equity (or total amount allotted for trading) and a user-defined percentage of the beginning equity to risk on each order. Percent of Total Equity allows a trader to trade more aggressively if they desire. For example, to trade more aggressively, a trader could increase the percentage of the beginning equity that the trader is willing to risk. An increased percentage will increase the potential profits and/or risk for a trader, just as a decreased percentage will decrease the potential profits and/or risk. Aggressive and conservative traders can both benefit from this risk management formula. The examples hereinafter utilize the Percent of Total Equity risk management formula. Of course it should be understood that there are many different risk management formulas that traders could use to assist in risk management.

It should also be understood that a trader could define their own risk management formula and risk parameters to use while trading.

At step 406, the GUI interaction component 308 provides via the output interface 318 the plurality of execution icons and a graphical interface that a trader can use to place orders to an exchange. In one embodiment, the graphical interface, as described above, may include one or more value axes, such as a price axis, for example, and a trader may place icons in relation to the value axis. Also, the graphical interface can display a chart illustrating historical and real-time market data corresponding to the tradeable object. In such an embodiment, to place an order, a trader could position an icon corresponding to a desired order type in relation to any point on the chart, and the icon object oriented execution application 300 could resolve the price for the order based on the selected point on the chart. According to one example embodiment, the chart is displayed in relation to a price axis and a time axis; however, different embodiments are possible as well.

At step 408, the GUI interaction component 308 detects a trader's input placing an icon on the graphical interface, and, at step 410 shown in FIG. 4B, the graphical interface displays the selected icon once the trader places the icon at a desired price level. At step 412, since the icon is auto-populated with the order parameters and the icon processing component 310 may determine order parameters based on the selected icon. Depending on the system configuration, at step 414, the icon object oriented execution application 300 or the trading application 202 may send the order to the exchange upon detecting one or more conditions defined for the order. As described in reference to earlier figures, the conditions can take many different formats, and can be based on market conditions, execution of other orders, time, or any other user-defined conditions.

When the order is submitted to the exchange, at step 414, the icon processing component 310 may start monitoring order state changes based on the information being provided by the exchange or based on user actions detected in relation to the icon at step 416. Then, when the icon processing component 310 detects an order state change, a format of the icon may be changed to reflect the order state change. As mentioned in earlier paragraphs, the icon processing component 310 can change colors of the icons based on a number of default or user-configured colors for different order states, such as exchange-based state changes, user action based state changes, or the combination thereof. For example, the exchange-based order state changes may include receiving a confirmation that an order has been received at an exchange, or receiving partial fill information for the order from the exchange, or that state of exchange or server connectivity. The trader-based order state changes may include, for example, detecting a user request to place, modify, or cancel an order. Also, a predefined color can be used to reflect a static state for an order, such as when the order is displayed on a graphical interface, but it has not been sent to an exchange yet, such as when the order icon is placed but the quantity has not yet been calculated. It should be understood that icon formats and colors could reflect different state changes as well. For example, icon formats could also change based upon user selection of icons, dragging of icon, or placing icons on the interface.

FIG. 5 illustrates a number of example order execution icons that can be used to represent different order types. More specifically, a rectangle can be used to represent a limit order 502, an octagon can be used to represent a stop order 504, an octagon with an interior "L" can be used to represent a stop limit order 506, an octagon with an interior star can be used for a trailing stop order 508, a square with an arrow pointing down can be used for a stop and reverse position order 510, and a circle can be used for a market order 512. It should be understood that the order types and graphical representations thereof in FIG. 5 are only examples, and different indicator representations for the same or different order types could also be used.

Figure 6:
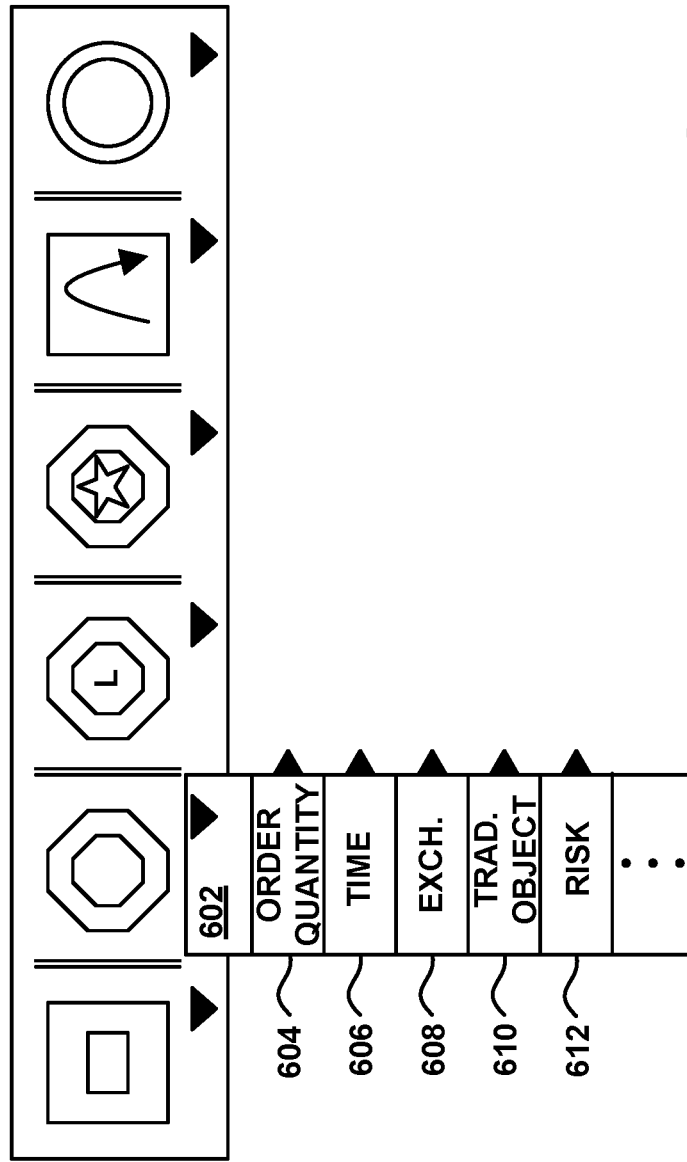
FIG. 6 is a block diagram illustrating one example order execution toolbar including a plurality of order type icons.

As mentioned earlier, when a trader logs into an exchange and selects a tradeable object for trading, the icon object oriented execution application 204 may display a graphical interface and a toolbar displaying a number of icons corresponding to different order types that the trader can use to trade the tradeable object. FIG. 6 is a block diagram illustrating one example order execution toolbar 600 that can be displayed in combination with a graphical interface. The order execution toolbar 600 includes six order icons described in reference to FIG. 5. As shown in FIG. 6, each order icon may be associated with a pull down menu enabling a trader to modify default values that have been predefined for the icon. Using the pull down menus a trader may also define risk parameter values that have not yet been defined.

As illustrated at 602, a trader can use the pull down menu to select an order quantity 604, a time when the order should be submitted to an exchange 606, or an exchange to which the tradeable object should be submitted 608 (such as when a tradeable object is offered at more than one exchange, and the trader is willing to have his order sent to any of the exchanges). Additionally, the order execution toolbar 600 may allow a trader to select the tradeable object icon 610 to select one ore more tradeable objects that the trader wishes to trade. Lastly, the trader could select the risk icon 612 to define risk parameters for a user-selected risk management formula. As previously stated, a trader could select the pull down menu to manually set a quantity by selecting the order quantity icon 604. Alternatively, the order quantity could be determined dynamically. To do so, a trader could select the risk icon 612 to define a desired risk management formula and to set risk parameters to be used with the formula. One of these options could be chosen to override the other by a trader. It should be understood that when a trader selects one of the icons on the pull down menu 602, another pull down menus may be displayed to represent choices associated with the selected icon. For example, the selection of the risk icon 612 on the pull down menu 602 may invoke another menu with specific risk management formulas and their corresponding risk parameters. It should be understood that the pull down menu options are only examples and different order-related, exchange-related, or trader-related options could be provided as well. For example, the pull down menu could contain an option for creating trading strategies or trading on multiple exchanges.

In addition to placing single orders to an exchange using order execution icons, a trader could use the icons to build trading strategies. A trading strategy may be defined with a complex order including two or more orders, where at least one order is dependent on one or more other orders in the group. For example, an Order Cancels Order ("OCO") is one example of such a complex order. The OCO typically includes a combination of two orders that control possible loss and possible profit that can be made when another entry order gets filled.

Figure 7:
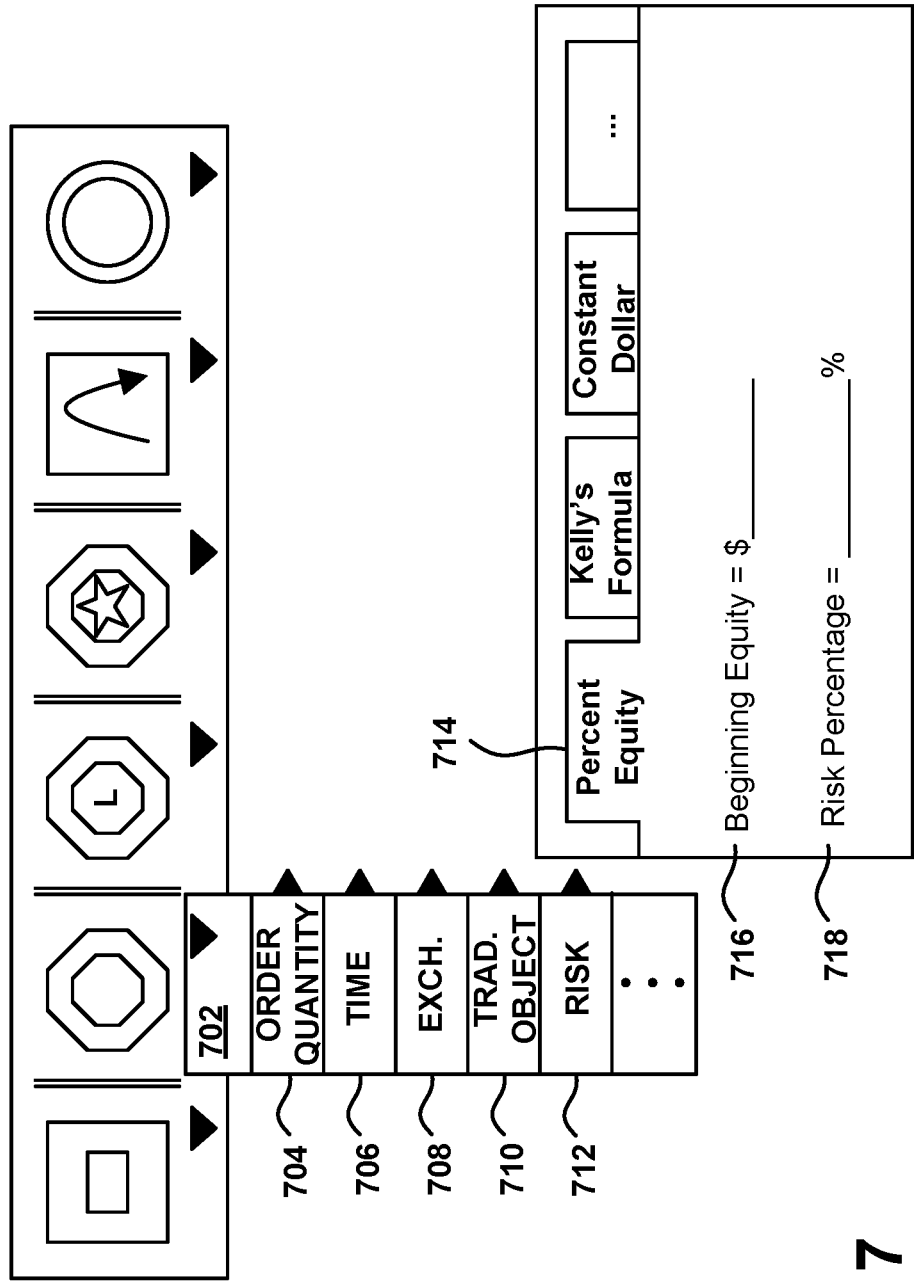
FIG. 7 is a block diagram illustrating one example order execution tool bar including an invoked risk management menu.

As mentioned earlier, using the pull down menu 602 shown in FIG. 6, a trader may select an icon to invoke another menu. For example, when a trader selects the risk icon 612, a risk management menu is invoked. FIG. 7 is a block diagram illustrating one example order execution toolbar 700 that can be displayed in combination with a graphical interface with the risk management menu invoked. The order execution toolbar 700 includes the same icons as previously described in FIG. 6, as well as the risk management menu 714.

The risk management menu 714 is used to define values associated with the risk parameters corresponding to a specific risk management formula. FIG. 7 displays the Percent of Equity risk management formula having been selected by a trader. However, different risk management formulas could be used, for example, as shown in FIG. 7, other risk management formulas could also be used such as Kelly's Formula, Constant Dollar, and others.

Based on the Percent of Equity risk management formula, the risk parameters that can be specified by the trader include Beginning Equity 716 and Risk Percentage 718. Beginning Equity 716 is defined as the total amount allotted to trade during the trading session. Beginning Equity is user-configurable and could be modified by a trader based on their profits and losses during the trading day. For example, a trader may start with a beginning equity of $10,000 and as the trading day progresses the trader may make a profit of $5,000 on his beginning equity of $10,000. At that time the trader could reconfigure the beginning equity to be $15,000.

The Risk Percentage 718 is defined as the total percentage the trader is willing to risk on each order or trading strategy. The percentage is also user-configurable and could also be modified based on a trader's profits and losses during the trading day. For example, if a trader has made profits throughout the trading day, the trader may wish to increase the risk percentage from, for example, 2% to 4%.

It should be understood that beginning equity and risk percentage values could also be dynamically modified by the trading system. For example, the trader could define profit and loss rules through the trading system. A trader could set a beginning equity rule based on overall profits and if the profits increase by $5,000 then dynamically modify the beginning equity to increase from $10,000 to $15,000. It should be understood that the risk percentage could be dynamically updated in a similar fashion. In an alternative embodiment the risk parameters could be displayed on the trading screen and could be manually modified on the fly by a trading. It should also be understood that the beginning equity and risk percentage values are used as examples and that any value could be used.

One example embodiment for entering orders for a trading strategy including an OCO will be described in reference to three orders, an entry order, a profit order, and a risk order. OCO orders are a particularly useful order type in that they allow traders to execute specific trading strategies based on market analysis, without having to watch the market. OCO orders can also be used as a risk management tool as they are way to lock in profits or protect from further losses.

Figure 8:
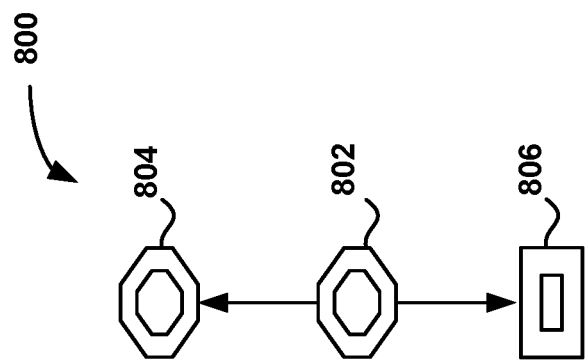
FIG. 8 is a block diagram illustrating one example trading strategy including an Order Cancel Order ("OCO")

FIG. 8 is a block diagram illustrating one example graphical representation of a trading strategy 800 including an OCO order using icons of the present invention. The trading strategy 800 includes an entry order 802 and an OCO order represented with icons 804 and 806. The graphically represented trading strategy 800 also illustrates order precedence defined using arrows, in this example. However, it should be understood that different graphical representations for defining order precedence could also be used, such as numerical indicators, for example. In this example embodiment, once the parent order associated with the icon 802 is filled, the OCO order pair is submitted to an exchange. It should be understood that the graphical representation of the trading strategy 800 could also represent a relationship between the OCO order pair corresponding to the icons 804 and 806. As known in the art, when one of the OCO orders gets filled, the other is automatically cancelled. Such order relationship may be represented by linking the two icons with a predefined line pattern/color, or by using any other user-defined graphical representation in relation to the icons.

FIG. 8 illustrates the entry order 802 using a stop order; however, the entry order could include different order types as well, such as a limit order, a stop limit order, or a market if touched ("MIT") order. Also, it is assumed in FIG. 8 that the icon 802 corresponds to a sell stop order, and the OCO order icons 804 and 806 are buy stop and buy limit orders, respectively. According to a example embodiment, when a trader places an entry order icon on the graphical interface, the icon processing component 308 may automatically detect whether the icon corresponds to a buy order or a sell order based on a position of the icon in relation to an inside market and an order type corresponding to the selected icon. For example, if a trader places a limit order icon or a market if touched order icon below the inside market, the icon processing component 308 will resolve such orders as buy orders. Then, if the same icons are placed above the inside market, the orders corresponding to the icons will be automatically marked as sell orders. In contrast, if a trader places a stop order icon or a stop limit order icon below the inside market, the icon processing component 308 will process such orders as a sell stop order and a sell stop limit order, respectively. If the same icons are placed above the inside market, the icons will correspond to buy orders. It should be understood that the example embodiments for automatic detection of buy and sell orders based on position of an icon in relation to an inside market are not limited to the order types given as examples above and could be applied in relation to different order types as well. Also, an icon may be automatically designated as a buy or a sell based on clicking the icon with a predetermined mouse button. For example, the right mouse button could correspond to a buy, and a left mouse button could correspond to a sell.

Referring back to FIG. 8, when a trader initiates creating the trading strategy 800 including an OCO order pair, the icon oriented execution application 300 may also control the sequence of positioning of order icons on the interface. In one example embodiment, the trader will first select and drop an entry order icon, the icon 802 in FIG. 8, then a risk stop, the icon 804, and finally an icon corresponding to a profit order, the icon 806 herein. However, it should be understood that different embodiments are possible as well, and the trader could position icons on the graphical interface in any trader defined sequence.

It should be understood that the trading strategy is not limited to using OCOs and could encompass any trader-defined strategy enabling a trader to link a plurality of different orders and to define a number of conditions that can be used by the icon oriented execution application 300 to determine when each order should be sent to an exchange. In one embodiment, a trader could define a trading strategy such that a fill of one order may trigger a process of sending another order corresponding to the same or different tradeable object to the same or different exchange.

Figure 9:
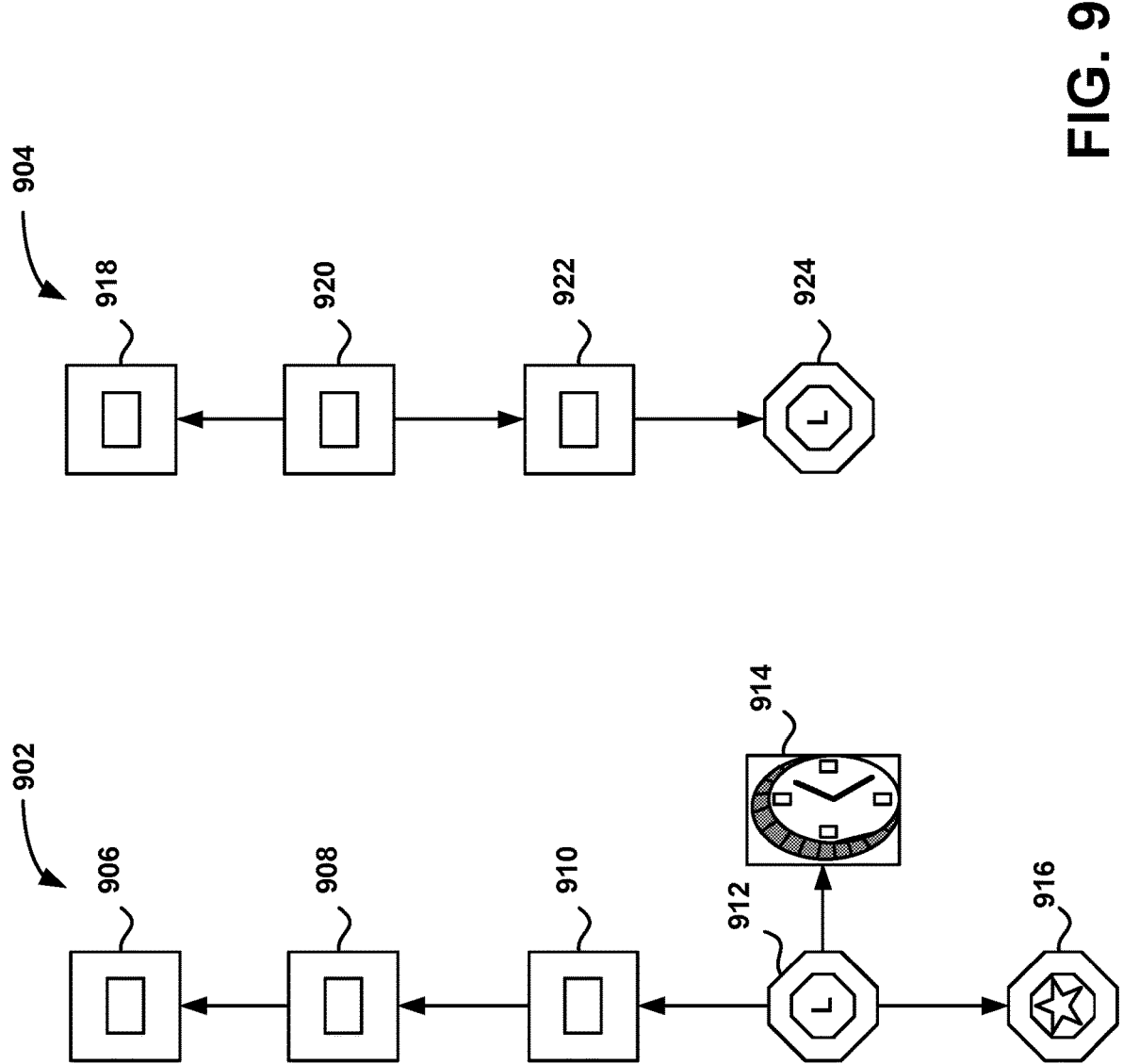
FIG. 9 is a block diagram illustrating two example trading strategies defined using a plurality of order execution icons.

FIG. 9 illustrates two example trading strategies 902 and 904 formed by connecting a plurality of order execution icons. It should be understood that the trading strategies illustrated in FIG. 9 are only examples, and more or fewer orders or different order types could be used to form trading strategies.

Referring to the trading strategy 902, the order execution icons 906-916 are connected by lines with arrows indicating the order execution precedence. In the embodiment illustrated in relation to the trading strategy 902, since all arrows are pointing away from the order 912, the order 912 is the main independent order that controls the execution of other dependent orders. It should be understood that a trader may define a number of conditions defining when each dependent order should be submitted to an electronic exchange. In one embodiment, the conditions may be based on a predetermined trigger detected in relation to another order. In such an embodiment, the order corresponding to the icon 906 could be submitted to an electronic exchange upon detecting a fill in relation to the order corresponding to the icon 908, and the order quantity of the order associated with the icon 906 may depend on the filled order quantity of the order corresponding to the icon 908. Similarly, the order quantity could be determined based on the predefined risk management method and the trader defined risk parameters.

Also, the determination as to which dependent order is submitted to an electronic exchange may depend on a direction of the market. For example, when the order corresponding to the icon 912 is filled, the icon object oriented execution application 300 could either trigger placement of the order 916 or 910 depending on the current direction of the market. Alternatively, both orders can be automatically submitted to one or more exchanges, depending on the user configuration. It will be apparent to those of ordinary skill in the art that many different configurations are possible as well.

Referring back to FIG. 9, the trading strategy 902 also includes a timed order corresponding to the icon 914. The timed order is illustrated as an order that depends on the order corresponding to the icon 912. The timed order can be associated with a number of time-based conditions. For example, one time could define when the order 914 should be submitted to an exchange once a fill for the order 912 is detected. Alternatively, the timed order can be submitted to the exchange at some specified time when no order quantity associated with the order 912 is filled until some specified time. It should be understood that different embodiments are possible as well.

The second trading strategy includes four orders corresponding to icons 918-924, where the icon 920 corresponds to the main independent order, and the other icons correspond to the dependent orders. The execution and placement of the dependent order may depend on any conditions described above in relation to the trading strategy 902; however, it should be understood that different trader-defined rules could also be used. For example, in addition to making some orders contingent on execution of another order, an order quantity corresponding to a dependent order may be contingent on an order quantity that is filled for an independent order. In such an embodiment, if only a portion of the independent order is filled, and one or more dependent orders are respectively triggered, the original order quantities of the dependent orders may be dynamically adjusted based on the order quantity filled for the independent order.

Figure 10:
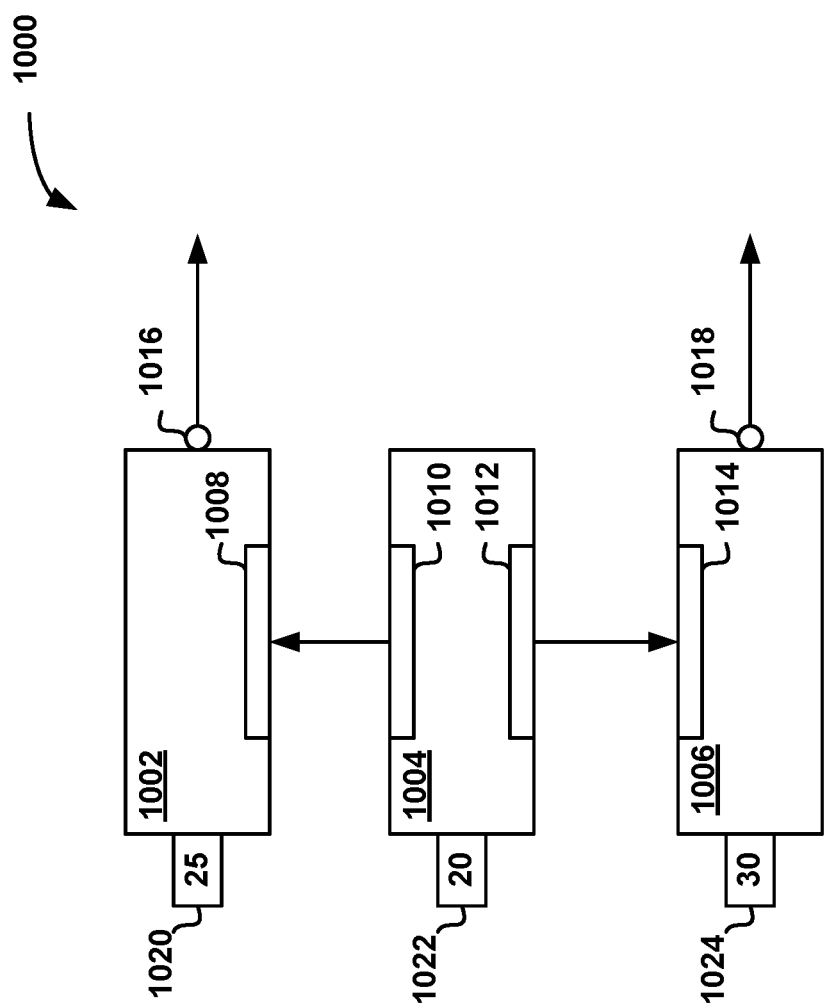
FIG. 10 is a block diagram illustrating another example embodiment of a trading strategy defined using a plurality of order execution icons.

FIG. 10 is a block diagram illustrating another example embodiment for representing a trading strategy 1000. The trading strategy 1000 includes three orders represented with three icons 1002, 1004, and 1006. In the embodiment illustrated in FIG. 10, the icons include graphical indicators that may enable a trader to quickly distinguish an independent order from dependent orders. More specifically, the icon 1004 corresponds to the independent order and includes two graphical indicators 1010 and 1012 on both sides of the icon 1004 from which the lines connecting other orders originate. Then, dependent orders include single indicators, such as indicators 1008 and 1014 corresponding to dependent orders 1002 and 1006, respectively. It should be understood that the indicators corresponding to independent orders and dependent orders could also be color-coded to enable a trader to distinguish the two order types even quicker. Also, it should be understood that the indicators could take different formats as well, such as numbering of orders based on the order dependency.

In addition to indicators that represent order dependency, the order icons 1002 and 1006 corresponding to the dependent orders include time setting icons 1016 and 1018 that can be used by a trader to define a time when each order should be submitted to an exchange. For example, when the order icons are displayed on a graphical interface in relation to a time axis, a trader could drag each time setting indicator to a position on the interface corresponding to a desired future time when the trader wishes to have the order submitted to an exchange. In one embodiment where the axis displays past time, the axis could be dynamically moved with the movement to time setting indicator to enable a trader to position the indicator at the desired future time on the axis.

Also, indicators corresponding to orders may display an order quantity corresponding to each respective order. The order quantities corresponding to orders associated with the indicators 1002-1006 are displayed in rectangular boxes 1020-1024 attached to the left sides of each indicator. However, it should be understood that order quantities could be displayed in relation to the indicators in any other user-configurable manner, and order quantities corresponding to the orders could be modified by changing the size of each icon.

Figure 11B:
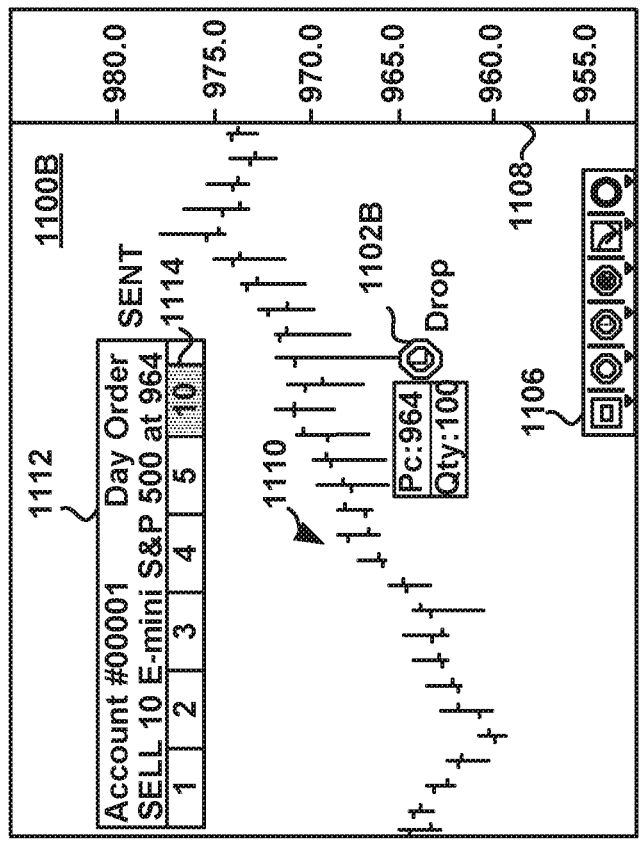
FIGS. 11A and 11B are block diagrams illustrating example graphical interfaces that can be used by a trader to place orders.
Figure 11A:
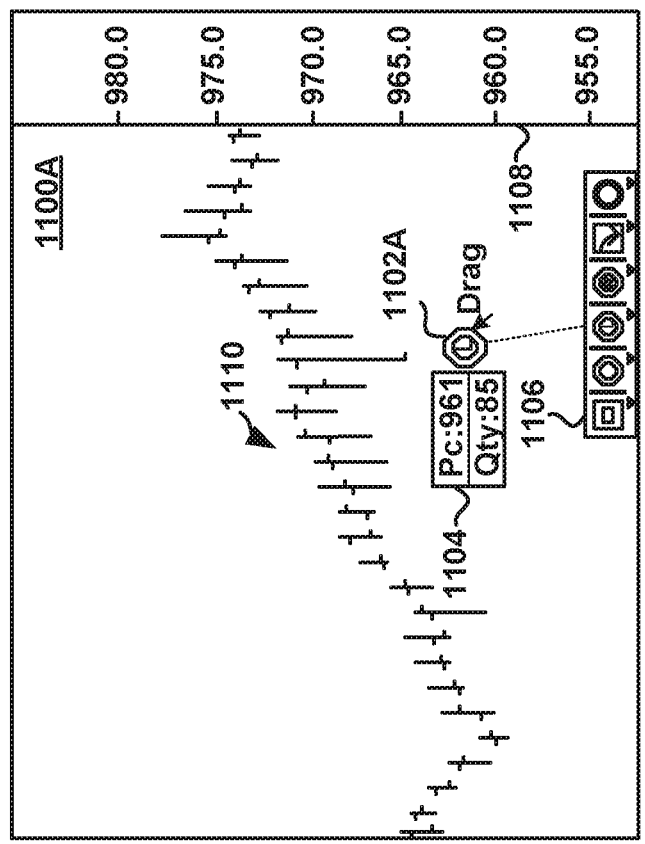

FIGS. 11A and 11B are block diagrams illustrating graphical interfaces 1100A and 1100B that can be used for pre-configuring orders using icons according to one example embodiment. In one embodiment, the icon oriented execution application 202 may display the graphical interface 1100A when a trader logs in to an exchange and selects a tradeable object that he wishes to trade.

Each graphical interface includes a value axis 1108 that in this example embodiment displays a number of price levels associated with the tradeable object. In one embodiment, the value axis 1108 may be a static axis or scale of values, such as prices, and the portion of the axis 1108 that is being viewed may be changed by scrolling up or down the axis or by entering a repositioning command. Alternatively, values do not need to be displayed in relation to the axis 1108. Also, the value axis can be displayed horizontally, n-dimensionally, or in any other fashion. It should be understood that while the example embodiments for using order execution indicators are described in reference to the display illustrated in FIGS. 11A and 11B, the present invention is not limited to any particular display.

Referring back to FIG. 11A, the interface 1100A also includes an order execution icon toolbar 1106 that has been described in greater detail in reference to FIG. 6. As described in reference to FIG. 8, the icon processing component 310 can automatically detect whether an order is a buy or a sell order based on a position of an icon in relation to an inside market, and further based on order type associated with the selected icon. However, rather than using the automatic detection, the order execution icon toolbar 1106 may enable a trader to select a buy order or a sell order in relation to each icon by simply selecting either buy or sell in a pull down menu associated with the desired icon. Alternatively, two different order execution icon toolbars could be displayed, with one corresponding to buy orders and another corresponding to sell orders. Additionally, the interface 1100A provides historical and real-time market data in a chart format at 1110, where the market data illustrated at the most right hand side of the chart 1110 correspond to the present time. In the illustrated embodiment, the historical and real-time market data are displayed in a bar chart format. However, it should be understood that different types of charts or non-charting applications could also be used to represent historical and present time quotes.

According to one example embodiment, the interface 1100A allows a trader to electronically transmit orders to an exchange by selecting one of the icons from the icon toolbar 1106, and dragging the icon to a position on the interface corresponding to a predetermined price, as shown in relation to an icon 1102A. As mentioned in reference to earlier figures, the order corresponding to the icon can be automatically submitted to an exchange upon detecting one or more conditions. Alternatively, the order may be automatically sent to an exchange once the icon is dropped at a desired price level on the interface and the quantity may be dynamically calculated once the icon is positioned at a desired price level. Also, it should be understood that while the icon 1102A is being moved to a desired price level, the trader can view the price levels during the process of moving the icon to the desired price level. Similarly, as the icon is being moved to a desired price level, the system could display what the quantity would be calculated to be if the icon was positioned at that price level. As illustrated in FIG. 11A, such prices and quantities can be displayed in relation to the icon 1102A, such as in a block illustrated at 1104. Also, as mentioned in reference to preceding figures, the icon object oriented execution application 204 can resolve the prices and quantities based on a position of the indicator in relation to the axis, such as based on a y-coordinate position of the icon on the interface in this particular example. Alternatively, if the trader selects a specific point on the chart, the application 204 can resolve the price and quantity for the new order using the selected point on the chart.

Referring to FIG. 11B, once the trader positions the icon at the desired price level, as shown at 1102B, the trading application 202 can be ready to send the order to an exchange once one or more conditions are satisfied. If the trader has defined risk parameters to associate with the order represented by order icons, then as the trader initially positions and moves the icon the trading application 202 will dynamically calculate the quantity. However, if risk parameters are not defined the order will be found ready to send to the exchange at that time. Also, the interface 1100B can display an order ticket 1112 reflecting order parameters when the order will be sent to an exchange. The order ticket may include trader-related as well as order status related information. The example order ticket 1112 includes a trader's account identifier, a tradeable object identifier associated with the order, a price level at which the order has been placed, and either a defined or dynamically calculated order quantity. It should also be understood that the order quantity could also be displayed next to the order icon instead of in the order ticket. Also, the order ticket 1112 defines whether the order is a buy order or a sell order, and the status of the order. In the example given in relation to FIGS. 11A and 11B, the order is a sell order, and the displayed status of the order is "sent." It should be understood that the displayed status of the order may change as the icon object oriented execution application receives additional information from the exchange or detects a user action, such as a user canceling the order from the exchange. In one embodiment, a trader could cancel an order by simply dragging an icon corresponding to the order away from the graphical interface. Alternatively, the interface could include a designated location to which a trader can drag an icon to cancel an order corresponding to the icon. However, it should be understood that different methods for canceling orders could also be used, such as detecting a predetermined key combination input, or clicking on an icon using a predefined mouse button.

Figure 12A:
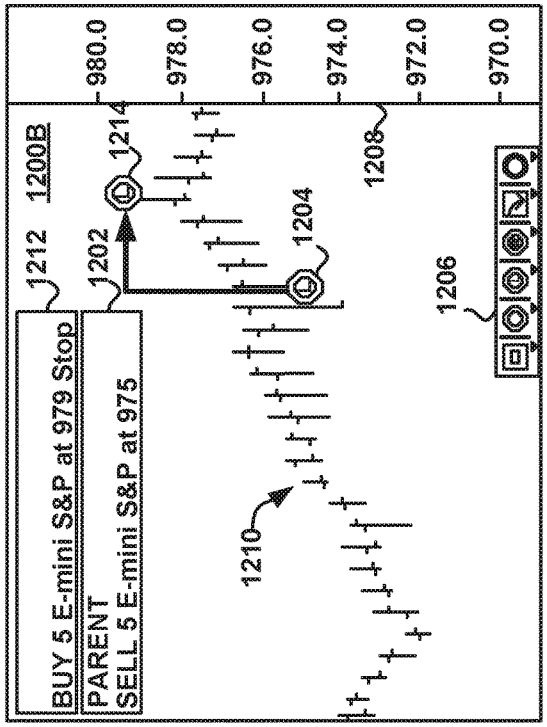
FIGS. 12A-12D are block diagrams illustrating example graphical interfaces that can be used by a trader to configure a trading strategy.
Figure 12B:
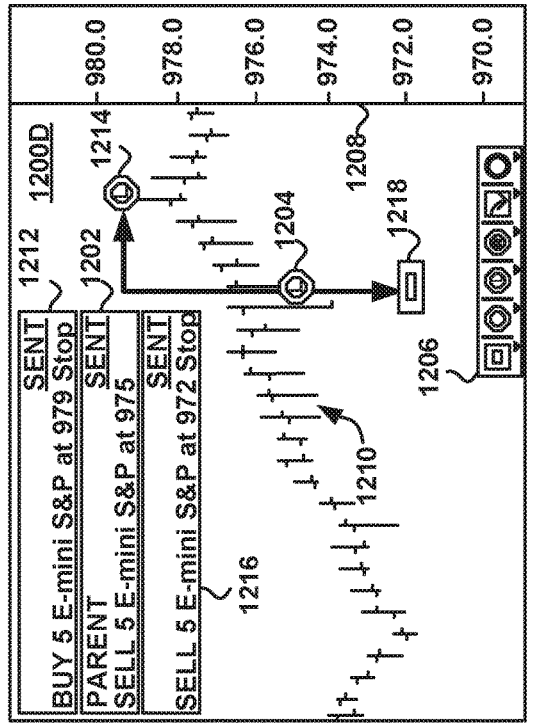

FIGS. 12A-12D are block diagrams illustrating graphical interfaces 1200A-1200B that can be used by a trader to configure trading strategies. The interfaces include the interface elements that have been described in relation to FIGS. 11A and 11B, including a price axis 1208, an icon toolbar 1206, and a chart 1210 providing historical and real time market data, such as any market quotes, related to a tradeable object. Referring to FIG. 12A, a trader may place a first order that will be sent to an exchange upon detecting one or more predefined conditions by selecting one of the icons on the toolbar 1206 and placing the icon at a desired price level, such as an icon 1204. In one embodiment, when the trader selects the icon 1204 from the toolbar, one of the options from a pull down menu may include a trading strategy option that, when selected by the trader in relation to the first order, may automatically launch the process of creating a trading strategy. In such an embodiment, the first icon selected by a trader may be associated with an independent parent order. Referring back to FIG. 12A, once the parent order icon is placed on the interface, the icon object oriented execution application 202 may display an order ticket 1202 defining potential order related and trader related information once the order corresponding to the icon is sent to an exchange.

Figure 12C:
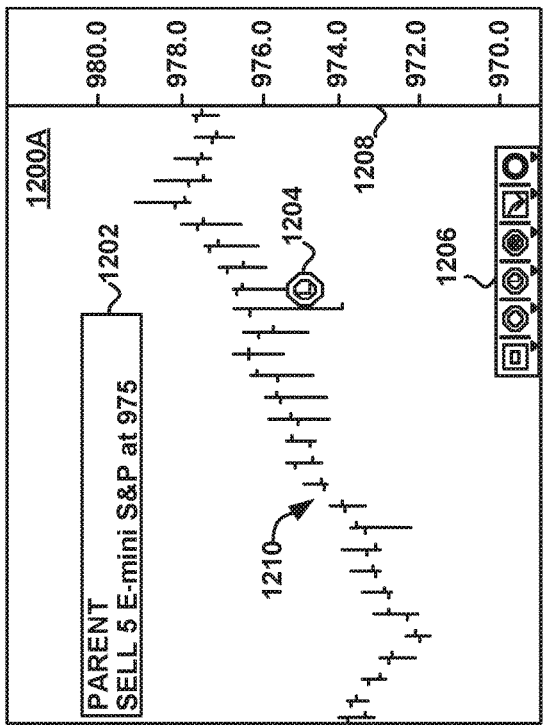
Figure 12D:
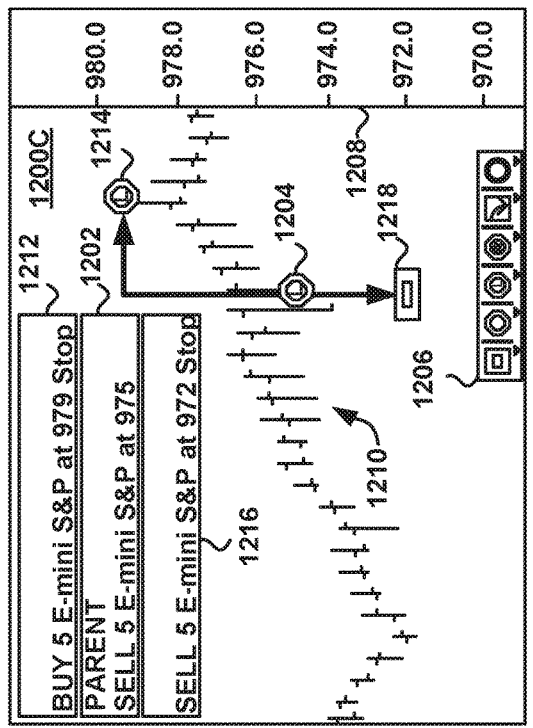

When the trader places the parent order icon on the interface, the next icon selected by the trader and corresponding to a dependent order may be graphically linked to the icon 1204 to illustrate the order execution precedence. For example, in FIG. 12B, the trader may select a second icon to correspond to a dependent order. Such icon, as illustrated at 1214, may be displayed in relation to, and may be linked to the icon 1204. When the trader drops the icon 1214 in relation to a specific point on the interface, an order ticket 1212 corresponding to the icon 1214 could be displayed in relation to the parent order ticket 1202. It should be understood, and as illustrated in FIG. 12C, the trading strategy may be associated with more than two orders. The graphical interface 1200C also illustrates an order ticket 1216 corresponding to a second dependent order associated with an icon 1218. FIG. 12D is a block diagram illustrating the trading strategy and order tickets with a modified order state statuses. More specifically, the status of each order, as illustrated in each order ticket, corresponds to the sent status.

FIGS. 12A-12D illustrate creating a trading strategy using a single graphical interface corresponding to the same tradeable object. However, it should be understood that a trader could create trading strategies by linking icons on different graphical interfaces, where the icons correspond to order types associated with different tradeable objects. Alternatively, as mentioned in reference to earlier figures, two or more value axes could be displayed in relation to a single graphical interface, and the value axes could correspond to different tradeable objects. For example, the value axes could be displayed in two different areas of the graphical interface, and an order icon can be automatically associated with a specific tradeable object based on the icon position in relation to one of the axes. Further, alternatively, two or more charts corresponding to different tradeable objects could be displayed on a single graphical interface, and positioning of an icon in relation to any point on one of the charts may be used to determine a tradeable object that a trader wishes to trade. It should be understood that different embodiments could also be used.

IV. Dynamically Determining Order Quantity

Figure 13:
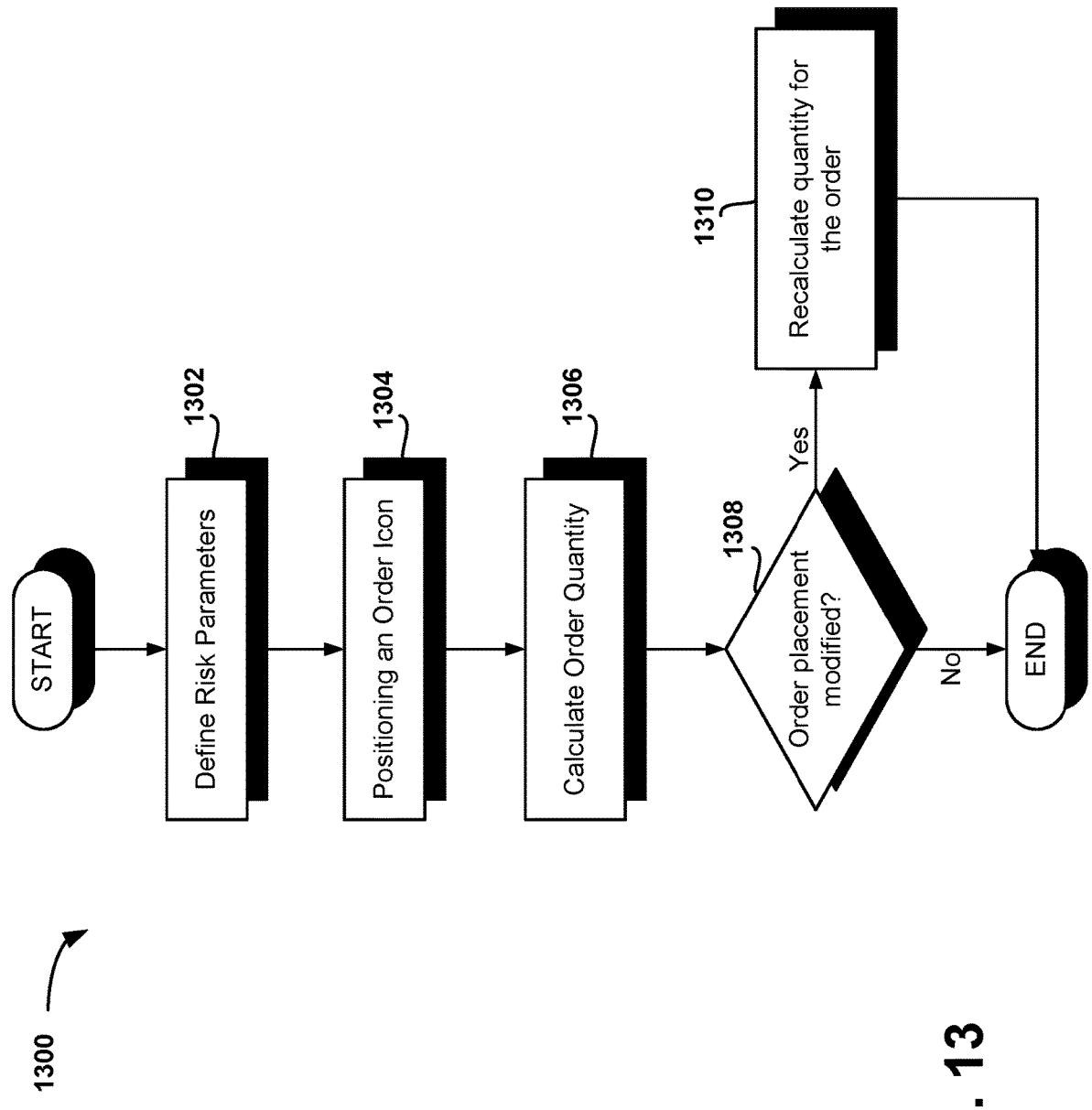
FIG. 13 is a flow chart illustrating one example method for placing an order with predefined risk parameters corresponding to a risk management formula.

FIG. 13 is a flow chart illustrating one example method 1300 for placing an order with predefined risk parameters corresponding to a user-selected risk management formula. It should be understood that the flow chart only shows the functionality and operation of a possible implementation of the present embodiments. In this regard, each block may represent a module, a segment, or a portion of the code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

The trader has selected a desired icon from the icon toolbar, such as shown at 1206 in FIGS. 12A-D, to place on the graphical interface. Once the desired icon is selected from the icon toolbar, the pull down menu, described in FIGS. 6 and 7, is invoked. The pull down menu provides a variety of selections for the trader. Based on the trader's selection, another pull down menu may display on the trading screen, or the trader may have the option to set parameter values to associate with the order.

At step 1302, the trader has selected the risk option from the pull down menu. Another pull down menu may be invoked and the trader can select a risk management formula to utilize for the trading session. A trader can define the one or more risk parameters once the desired risk management formula is selected. Based on the example described earlier, it may be assumed that the Percent of Total Equity is the selected risk management formula. However, it should be understood than any risk management formula could be selected.

Once the risk management formula is selected the trader can predefine the one or more corresponding risk parameters. When using the Percent of Total Equity, the corresponding risk parameters are a "Beginning Equity" and a "Risk Percentage". Beginning Equity is defined as the total amount allotted to trade at that time. For example, a trader defines the beginning equity to be a value of $100,000.

The Risk Percentage is defined as the total percentage the trader is willing to risk on an order. Similarly, the trader defines the risk percentage to be a value of 2%.

Using the predefined risk parameters, the trading application can apply the Percent of Total Equity Formula to calculate the quantity available to trade. Based on the calculation below, the trader has a total of 2,000 to risk on an order.

$$\text{Beginning Equity} * \text{Risk Percentage} = \text{Qty available to risk while maintaining profits } \$100,000*2\%=2,000$$

In one embodiment, once the trader has selected a risk management formula and defined the risk parameters corresponding to the risk management formula, the trader can now place an order via the graphical user interface. At step 1304, the trader can select an icon from the toolbar as displayed in one of the graphical user interfaces in the previous figures. If the trader has also selected the option from the pull down menu that will automatically create a trading strategy, then the first icon selected by a trader will be associated with an independent order and subsequent selected icons will be dependent orders based on their placement in relation to the entry order. In this example the independent order is an entry order and the dependent orders are a profit order and a risk order. This may be a user-configurable setting.

To place an order according to one example embodiment, the trader can drag the order icon from the icon toolbar to the desired price level for placing the order to the electronic exchange. As a result of the trader defining risk parameters and selecting the automatic creation of trading strategies, the trading system will recognize that the order is an entry order and that it should not send the entry order to the exchange immediately, but will instead wait until all orders have been placed. At which point the trading system may dynamically calculate the quantity for the orders that have been placed.

It should be understood that the trading system could also calculate the quantity for an order icon as the trader is positioning the icon; according to this example. As the icon passes through different price levels the quantity would change. This would also aid the trader in determining where to place order icons.

To illustrate one example embodiment, the trader drags the first order icon to a price of 983.00 along the price axis in the graphical interface. If the trader only placed one order, that entry order would be submitted with a quantity of 2000. The same method can be applied to trading strategies containing multiple orders. For example, the trader is interested in submitting a trading strategy which contains multiple orders. The trader then drags a second order icon to a price of 990.00 along the price axis, which corresponds to a profit order. Similarly, the trader then drags a third order icon from the tool bar to a price of 975.00, corresponding to a risk order, which completes the OCO trading strategy.

At step 1306, the system considers the prices of each of the orders to calculate the quantity for each order. The system determines the total risk associated with the orders by taking the difference between the prices of the entry order and risk order. For example, the difference between the entry order and the risk order is 983.00−975.00=8.00. The difference is considered to be the total risk. The system then takes the previously determined quantity available to risk and divides it by the total risk to calculate the quantity for the entry and risk orders in the trading strategy.

Qty available to risk/total risk=Quantity to associate
with each order 2000/8=250

Based on the calculation, a quantity of 250 will be dynamically associated with the entry and risk orders placed on the graphical interface. According to the example embodiments, the trading system will automatically recognize that the trader is now finished placing orders on the interface, that the quantities have been calculated, and that the entry and risk orders are ready to automatically submit to the exchange. The entry and risk orders are then submitted to the exchange. The profit order is not submitted to the exchange until the entry order is partially filled.

When the entry order quantity is partially filled, the system will then determine the quantity for the profit order placed at a price of 990.00. The system directly relates the quantity partially filled from the entry order to the quantity of the profit order. For example, if the entry order is placed with a quantity of 250 and 200 of that quantity is partially filled before the market moves up, the profit order will assume a quantity of 200. If only 100 of the quantity associated with the profit order is partially filled, and the market proceeds to move down, the remaining unfilled quantity, then the risk order quantity is modified to equal:

Entry order filled quantity−profit order filled
quantity=risk order quantity 200−100=100

At step 1308 the trader may decide to modify the prices at which orders are pending. If the market is extremely volatile, it could shift and move in a moments notice. Since the trader has entered multiple orders, the trader is most like covered for a movement in either direction. However, based on market conditions, the trader may need to decide if modifying the orders would increase profits and reduce risk at that time.

At step 1310, the system may dynamically adjust the previously calculated order quantities based on if the trader selects another price for an order. If the entry order has not yet been filled and the entire quantity still remains, the order locations can be modified and the quantities recalculated dynamically. The trader may continue to modify the locations of each order until the order has been filled.

It should be understood that the previously described scenario is an example and that any other values or formulas could be used to calculate the quantities to associate with each order in a trading strategy.

Figure 14:
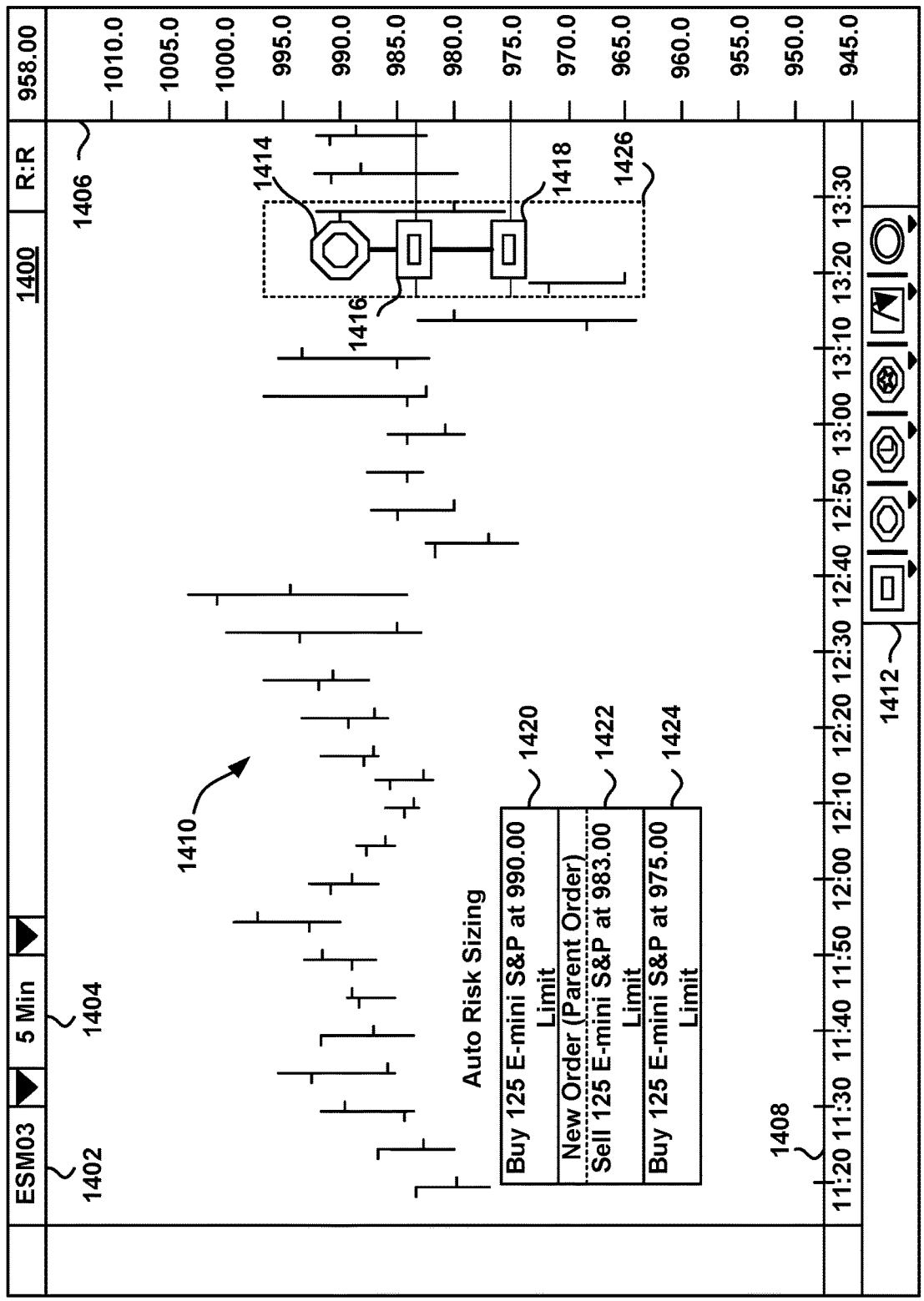
FIG. 14 is a block diagram illustrating a graphical interface used to place and modify orders according to a selected risk management formula.

FIG. 14 is a block diagram illustrating a graphical interface 1400 that illustrates the example OCO trading strategy described with reference to FIG. 13. Similar to the earlier described graphical interfaces, the interface 1400 includes a tradeable object identifier 1402, a time increment selection input 1404 for a time axis, a price axis 1406, a time axis 1408, a quote chart 1410, and an icon toolbar 1412. The interface also displays a trading strategy including the three previously described orders with reference to FIG. 13, 1414-1418 associated with three order tickets 1420-1424, as well as an indicator 1426 around the trading strategy to easily distinguish it from other orders in the market and other markings on the graphical interface. It should be understood that any indicator could be used to distinguish the trading strategy from other orders.

The orders 1414-1418 making up the OCO trading strategy were dragged by the trader from the icon toolbar 1412. A trader may, at any time, place another order or add another order to the trading strategy by dragging one or more order icons onto the graphical interface. A trader could also select an order icon and delete it from the trading strategy, at which time the trading system would dynamically recalculate the quantity to associate with each order remaining in the trading strategy.

The order tickets 1420-1424 correspond to the orders 1414-1418, respectively. Order ticket 1420 provides the type of order, the quantity of the order, the contract, and the price of the order for the trader for order 1414. Order tickets 1422 and 1424 provide the same information for their corresponding orders 1416 and 1418. It should be understood that the information displayed in the order ticket could be modified or displayed at different areas of the graphical interface. For example, the dynamically calculated quantity could be displayed in relation to the order icon, such as next to or inside of the order icon. It should also be understood that the order icon could be sized to reflect the calculated quantity corresponding to each order, wherein a larger icon would correlate to a larger quantity and a smaller icon would correlate to a smaller quantity.

The example embodiments discussed above describe a trading system and interface that allow for dynamic calculation of order quantity to be use for risk management. To dynamically calculate an order quantity to associate with the orders in a trading strategy, the trading system allows traders to select risk management formula and define the corresponding risk parameters. Once the parameters are defined, the trader can place orders through the graphical interface and the quantity to associate with each order will be dynamically calculated before the submission of the orders.

Along with the trader being able to optimize their potential profits, the trader is relieved from the responsibility of manually calculating risk management formulas and then manually determining the quantity to associate with each order. A trader will be able to focus their attention on market conditions, new orders, and their existing orders instead of how much quantity to risk on each order.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for dynamically determining quantity for risk management may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:
1. A method comprising:
  displaying a plurality of locations on a graphical user interface, each location corresponding to one of a plurality of price levels, wherein the plurality of locations are along a price axis;

displaying a first order icon associated with a first risk parameter for determining a quantity for an order based on a selected price;

moving the first order icon to a first location of the plurality of locations corresponding to a price level along the price axis;

in response to moving the first order icon to the first location, computing a first order quantity based on the first risk parameter and based on the price level corresponding to the first location that the first order icon has been moved to; and sending a first order to an electronic exchange, wherein the first order has a plurality of order parameters comprising the first order quantity and the price corresponding to the first location of the first order icon.

2. The method of claim 1, wherein the price levels comprise prices or price-based values corresponding to market information received from the electronic exchange for a tradeable object, the market information comprises an inside market representing a highest bid price and a lowest ask price, a last traded price, and a last traded quantity.

3. The method of claim 1, further comprising:
displaying price values at the price levels on the graphical user interface.

4. The method of claim 1, further comprising:
receiving a selected risk management formula; and
setting a corresponding risk parameter.

5. The method of claim 1, further comprising:
setting an additional risk parameter corresponding to the selected risk management formula.

6. The method of claim 1, wherein the first risk parameter is a user-configured value.

7. The method of claim 1, further comprising:
defining a user's own risk management formula and set a corresponding risk parameter.

8. The method of claim 1, further comprising:
displaying the risk parameter in the graphical user interface.

9. The method of claim 1, further comprising:
modifying the risk parameter; and
updating the first order quantity based on the modified risk parameter.

10. The method of claim 1, further comprising:
displaying the first order quantity in relation to the first order icon.

11. The method of claim 1, further comprising:
receiving an overwrite command to overwrite the first order quantity with a user-defined order quantity.

12. The method of claim 1, wherein the first order icon is selected from a plurality of order icons, wherein each of the plurality of order icons is associated with a trading strategy.

13. The method of claim 1, further comprising:
changing a size of the first order icon to reflect an order quantity based on a location the first order icon as the first order icon is being moved along the price axis.

14. The method of claim 1, further comprising:
displaying a second order icon associated with a second risk parameter for determining a quantity for an order based on a selected price;

moving the second order icon in accordance to a second location of the plurality of locations corresponding to a price level along the price axis;

in response to moving the second order icon, computing a second order quantity based on the second risk parameter and based on the price level corresponding to the second location that the second order icon has been moved to; and sending a second order to an electronic exchange, wherein the second order has a plurality of order parameters comprising the second order quantity and the price corresponding to the second location of the second order icon.

15. The method of claim 14, wherein the second order is a dependent order based on at least partial execution of the first order.

16. The method of claim 14 further comprising:
computing the quantity of the second order based on a partial fill quantity of the first order.

17. The method of claim 14 further comprising:
deleting the second order from the electronic exchange when the first order quantity is completely filled.

* * * * *